(12) United States Patent
Azami et al.

(10) Patent No.: US 9,960,816 B2
(45) Date of Patent: May 1, 2018

(54) POWER RECEIVING DEVICE, AND INFORMATION PROCESSING METHOD

(71) Applicant: FUJITSU LIMITED, Kawasaki-shi, Kanagawa (JP)

(72) Inventors: Toshihiro Azami, Yokosuka (JP); Akiyoshi Uchida, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 471 days.

(21) Appl. No.: 14/643,817

(22) Filed: Mar. 10, 2015

(65) Prior Publication Data

US 2015/0280791 A1    Oct. 1, 2015

(30) Foreign Application Priority Data

Mar. 31, 2014  (JP) ................ 2014-074792

(51) Int. Cl.
*H02J 5/00* (2016.01)
*H04B 5/00* (2006.01)
*H02J 50/40* (2016.01)
*H02J 50/10* (2016.01)
*H02J 7/00* (2006.01)
*H02J 7/02* (2016.01)
(Continued)

(52) U.S. Cl.
CPC .......... *H04B 5/0037* (2013.01); *H02J 7/0004* (2013.01); *H02J 7/025* (2013.01); *H02J 50/10* (2016.02); *H02J 50/12* (2016.02); *H02J 50/40* (2016.02); *H02J 50/80* (2016.02); *H04B 5/0093* (2013.01)

(58) Field of Classification Search
CPC .......... H02J 50/80; H02J 50/12; H02J 7/0004; H02J 7/025; H04B 5/0037; H04B 5/0093

USPC .......................................................... 307/104
See application file for complete search history.

(56) References Cited

U.S. PATENT DOCUMENTS 8,140,129 B2 * 3/2012 Suzuki .............. H04W 52/0261
                                                455/572
8,368,515 B2 * 2/2013 Kim ................... G06K 7/10237
                                                 340/10.1

(Continued)

FOREIGN PATENT DOCUMENTS

JP    2006-067488 A    3/2006
JP    2008-148242 A    6/2008
JP    2013-178326      9/2013

OTHER PUBLICATIONS

Japanese Office Action dated Dec. 12, 2017 for corresponding Japanese Patent Application No. 2014-074792 with Full Machine Trnaslation.

*Primary Examiner* — Dinh T Le

(74) *Attorney, Agent, or Firm* — Maschoff Brennan

(57) ABSTRACT

A power receiving device that receives power from a power supply device, according to a predetermined wireless power supply scheme for transmitting a control signal through wireless communication, includes a communication circuitry for a terminal, configured to perform communication with a terminal including a power supply to which power received by the power receiving device is supplied, a reception circuitry configured to receive a predetermined control signal from the power supply device, a memory, and a processor coupled to the memory, configured to perform power control and a setting of an operation mode of the terminal, based on the predetermined control signal, through the communication circuitry for a terminal.

11 Claims, 30 Drawing Sheets

(51) Int. Cl.
*H02J 50/12* (2016.01)
*H02J 50/80* (2016.01)

(56) References Cited

U.S. PATENT DOCUMENTS

| | | | |
|---|---|---|---|
| 9,088,171 B2* | 7/2015 | Won | H01M 10/44 |
| 9,369,007 B2* | 6/2016 | Kim | H02J 17/00 |
| 2006/0046704 A1 | 3/2006 | Hori et al. | |
| 2014/0245464 A1* | 8/2014 | Chu | G07F 15/10 |
| | | | 726/35 |

\* cited by examiner

FIG. 1
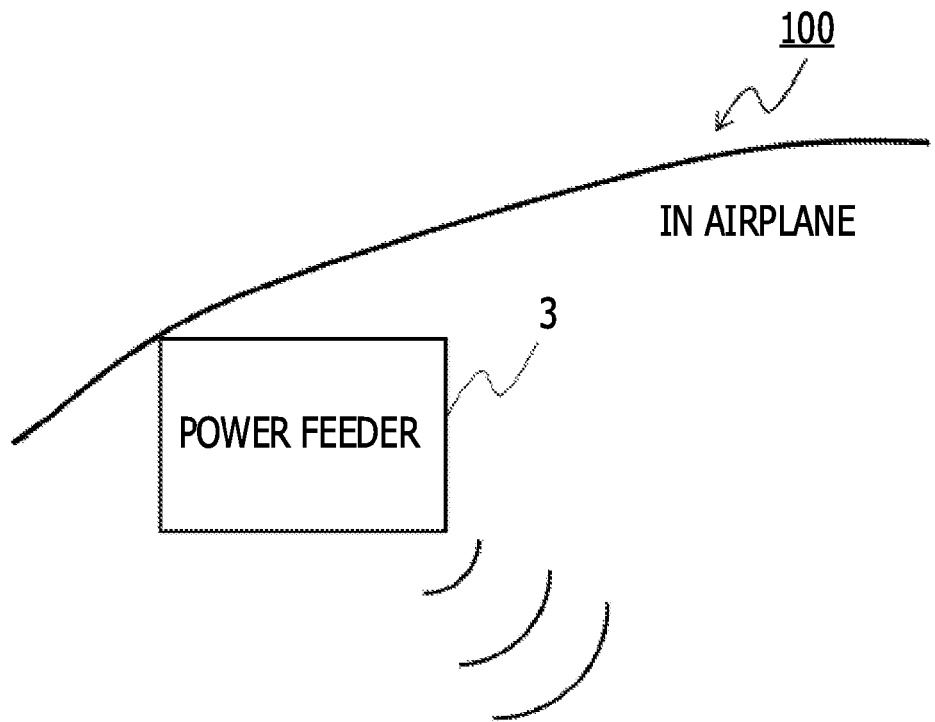
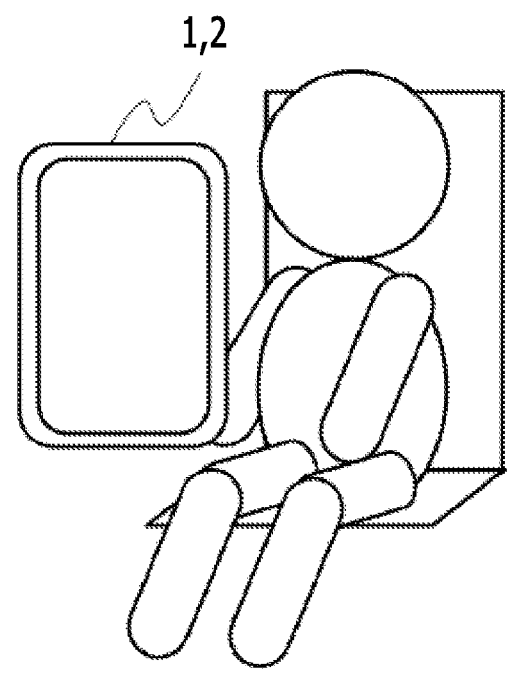

FIG. 6

TERMINAL CONTROL MESSAGE

| MESSAGE TYPE | TERMINAL CONTROL |
|---|---|
| POWER CONTROL OF TERMINAL | ON/OFF/Don't care |
| OPERATION MODE OF TERMINAL | NORMAL/SILENT/DRIVE/AIRPLANE/···/Don't care |
| OPERATION MODE OF NEXT ACTIVATION OF TERMINAL | NORMAL/SILENT/DRIVE/AIRPLANE/···/Don't care |

FIG. 13

EXAMPLE OF DATA STORED IN TERMINAL
POSITION STORAGE UNIT

| POSITION OF TERMINAL | POSITION MEASUREMENT TIME |
|---|---|
| APRON | 2010.11.12 12:34 |

FIG. 14

POWER SUPPLY CONTROL MESSAGE

| MESSAGE TYPE | POWER SUPPLY CONTROL |
|---|---|
| POWER SUPPLY CONTROL | POWER SUPPLY TERMINATION/ POWER SUPPLY START |
| REASON | SPECIFIC AREA |
|  |  |

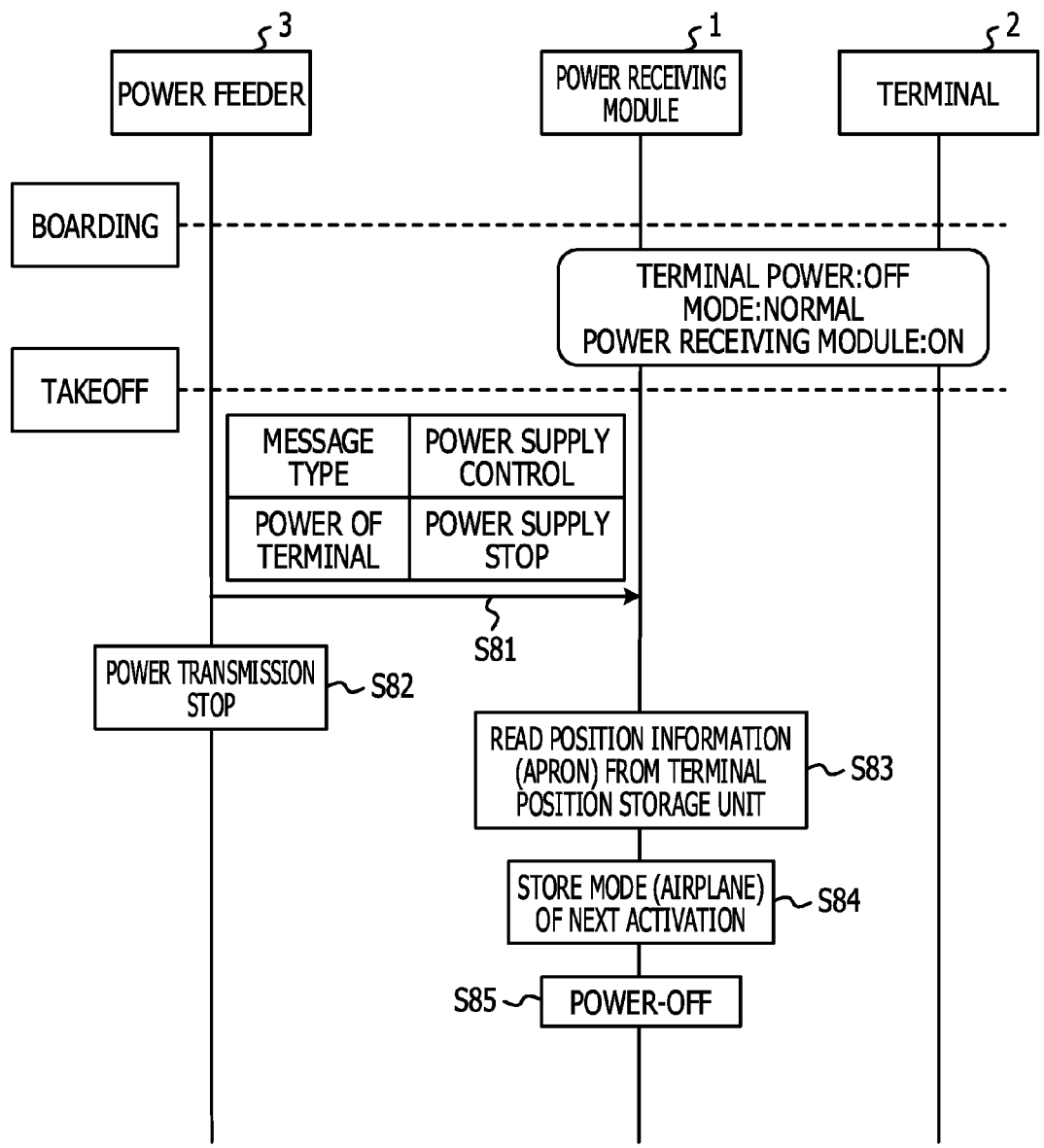

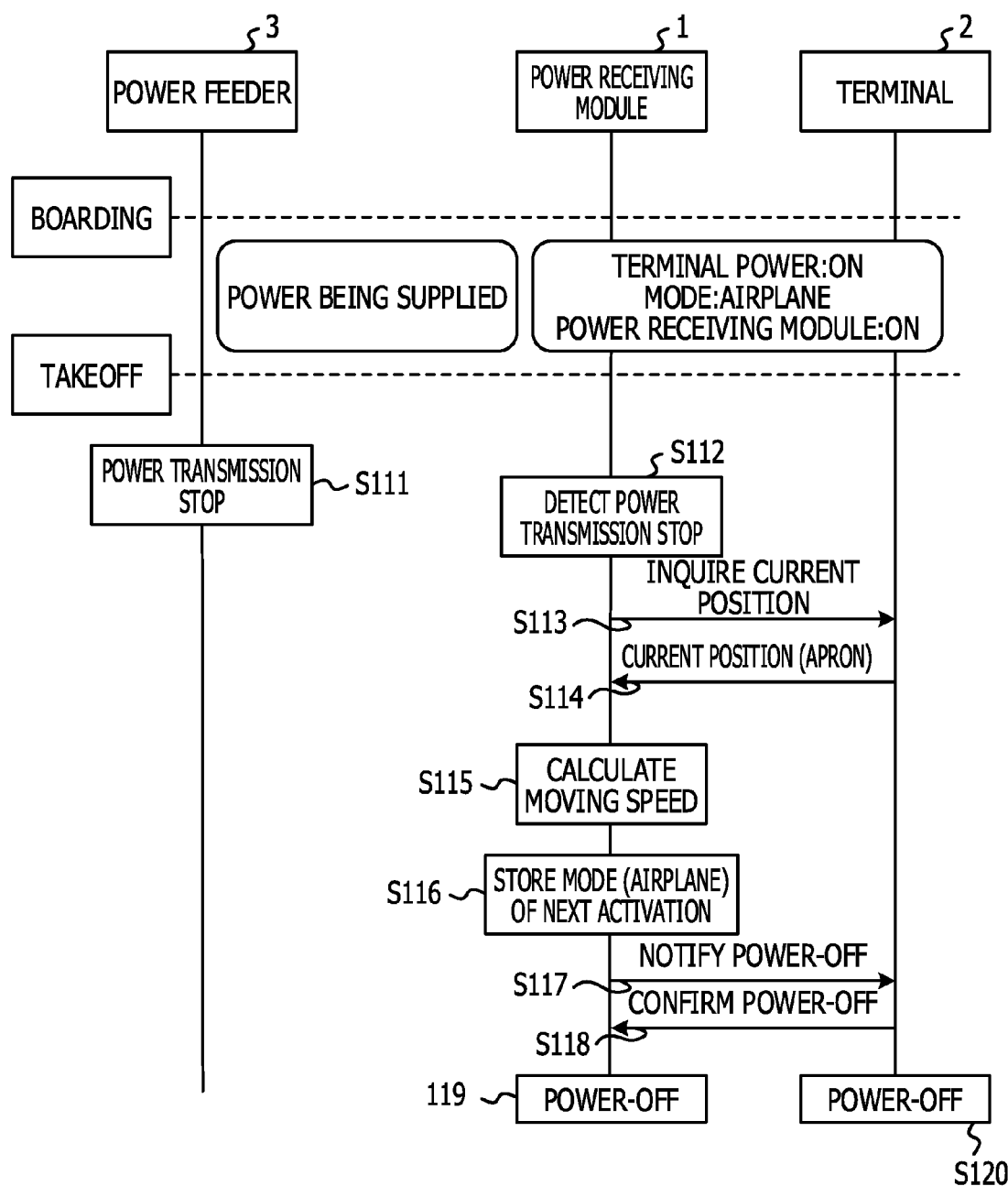

POWER RECEIVING DEVICE, AND INFORMATION PROCESSING METHOD

CROSS-REFERENCE TO RELATED APPLICATION

This application is based upon and claims the benefit of priority of the prior Japanese Patent Application No. 2014-074792, filed on Mar. 31, 2014, the entire contents of which are incorporated herein by reference.

FIELD

The embodiments discussed herein are related to a power receiving device of a wireless power supply scheme, and an information processing method.

BACKGROUND

A plurality of operation modes are available in a portable terminal such as a smartphone, and a cellular phone terminal. For example, a "silent mode" is an operation mode in which a ringtone is not made in public places. For example, an "airplane mode" is an operation mode in which the portable terminal is usable so as not to emit radio waves in an airplane. For example, a "drive mode" is a mode in which if there is an incoming call, a message notifying a caller that a user is driving. Examples of a method for setting the operation mode of the portable terminal include a manual setting method by the user, or a method in which if a predetermined signal is received from a transmitter, a setting is performed. These technologies are disclosed in Japanese Laid-open Patent Publication No. 2006-67488 and Japanese Laid-open Patent Publication No. 2008-148242.

SUMMARY

According to an aspect of the invention, a power receiving device that receives power from a power supply device, according to a predetermined wireless power supply scheme for transmitting a control signal through wireless communication, includes a communication circuitry for a terminal, configured to perform communication with a terminal including a power supply to which power received by the power receiving device is supplied, a reception circuitry configured to receive a predetermined control signal from the power supply device, a memory, and a processor coupled to the memory, configured to perform power control and a setting of an operation mode of the terminal, based on the predetermined control signal, through the communication circuitry for a terminal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating a configuration example of a wireless power supply system according to a first embodiment;

FIG. 6 is a diagram illustrating an example of information contained in a terminal control message;

FIG. 8 is a diagram illustrating an example of a flowchart of a process when power of the portable terminal is turned on;

FIG. 13 is an example of data stored in a terminal position storage unit of the power receiving module;

FIG. 14 is a diagram illustrating an example of information contained in a power supply control message;

FIG. 17 is a diagram illustrating an example of a process sequence among the power receiving module, the portable terminal, and the power feeder, when the portable terminal is in the power-off state, the power receiving module is in the power-on state, and the user is aboard the airplane;

FIG. 21B is a diagram illustrating an example of a process sequence when the portable terminal is activated in the airplane mode while the airplane is cruising, and thereafter, the airplane is prepared for landing.

DESCRIPTION OF EMBODIMENTS

Figure 2:
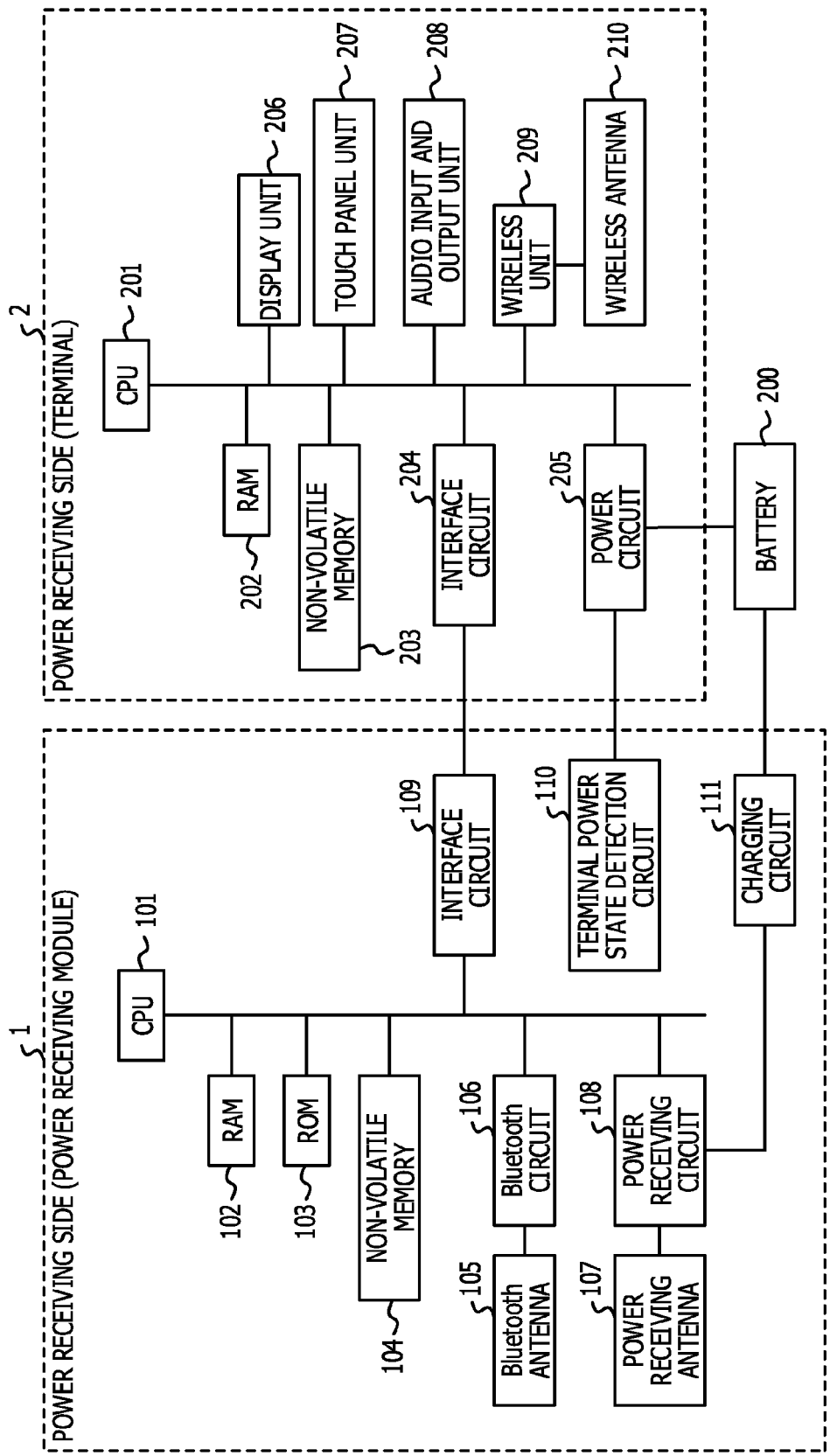
FIG. 2 is a diagram illustrating an example of hardware configurations of a portable terminal and a power receiving module which are devices on a power receiving side.

Manually changing of the setting of an operation mode of a portable terminal depending on a location and a situation is troublesome to the user. Although it is possible to change the operation mode in a state in which power of the portable terminal is on, it is not possible to receive a predetermined signal from a transmitter and change the operation mode in a state in which the power is not input. Therefore, when power is not input to the portable terminal, in a situation in which radio wave transmission from the portable terminal is not allowed, for example, in an in-flight airplane or a hospital, the portable terminal may be activated in a mode in which radio waves are emitted in some cases.

Hereinafter, the embodiments of the present disclosure will be described with reference to the drawings. The configurations of the embodiments are illustrative, and the present disclosure is not limited to the configurations of the embodiments.

First Embodiment

As a method of charging a terminal operating in a battery, such as a portable terminal, there is a wireless power supply scheme without using a charging cable. Examples of the wireless power supply scheme include an electromagnetic induction scheme and a magnetic field resonance scheme.

In a wireless power supply scheme of the magnetic field resonance scheme, even if a power supply device and a power receiving device are separated a few tens of centimeters to a few meters, charging may be performed. Further, it is possible for a single power supply device to supply power to a plurality of power receiving devices.

Prior to the start of power supply, information exchange by using a control signal is performed between the power supply device and the power receiving device, as a power supply preparation. In the Alliance for Wireless Power (A4WP) which is one of the technical standards of the magnetic field resonance scheme, Bluetooth (registered trademark) is adopted for the information exchange of the control signal between the power supply device and the power receiving device.

Further, the power receiving device corresponding to the wireless power supply scheme is likely to be configured so as to continue to maintain a power-on state and to be chargeable, even if the power of a terminal body including a power supply, to which received power is supplied, is disconnected.

Thus, in the first embodiment, the power receiving device performs the setting of the operation mode of the terminal, by using a control signal of the wireless power supply scheme, regardless of the status of the power-on or off of a terminal body including a power supply to which received power is fed.

System Configuration

FIG. 1 is a diagram illustrating a configuration example of a wireless power supply system 100 according to a first embodiment. The wireless power supply system 100 is a system which is constructed in an airplane, and in which a wireless power supply scheme of the magnetic field resonance scheme is adopted. The wireless power supply system 100 includes a portable terminal 2 that a passenger holds, a power receiving module 1 of the portable terminal 2, and a power feeder 3.

The portable terminal 2 and the power receiving module 1 form a set. It is assumed that a plurality of the portable terminals 2, the power receiving modules 1, and the power feeders 3 are included in the wireless power supply system 100. Further, a single power feeder 3 is able to supply power to a plurality of power receiving modules 1. However, for convenience, FIG. 1 illustrates a pair of the portable terminal 2 and the power receiving module 1, and the power feeder 3.

Prior to the start of power supply, a control signal is exchanged between the power feeder 3 and the power receiving module 1. In the first embodiment, the power feeder 3 notifies the power-on or off of the portable terminal 2, an operation mode, and the like, by using a control signal, and the power receiving module 1 performs the power control and the setting of the operation mode of the portable terminal 2, in accordance with the notification.

In the airplane in which the wireless power supply system 100 is constructed, until the airplane enters a stable flight state from a takeoff, and until a landing is completed after the airplane is prepared for landing, it is assumed that power of the portable terminal 2 is desired to be cut in the airplane, in order to avoid adverse effects for an airplane system. Further, during the stable flight, when the portable terminal 2 is activated, it is assumed that the activation by the "airplane mode" which does not emit radio waves is desired.

Configuration of Receiving-Side Device

FIG. 2 is a diagram illustrating an example of hardware configurations of the portable terminal 2 and the power receiving module 1 which are devices on the receiving side. The power receiving module 1, for example, may be incorporated into the portable terminal 2, or may be incorporated into a jacket type battery pack of the portable terminal 2. The power receiving module 1 is an example of the "power receiving device".

The power receiving module 1 includes a central processing unit (CPU) 101, a random access memory (RAM) 102, a read only memory (ROM) 103, a non-volatile memory 104, a Bluetooth antenna 105, a Bluetooth circuit 106, a power receiving antenna 107, a power receiving circuit 108, an interface circuit 109, a terminal power state detection circuit 110, and a charging circuit 111.

The RAM 102 is a volatile semiconductor memory. The RAM 102 provides a work area and a storage area to the CPU 101. The ROM 103 is a non-volatile semiconductor memory. The ROM 103 stores for example, a power receiving control program for a power receiving module, and a terminal operation mode setting program for the power receiving module. The power receiving control program for the power receiving module is a program for controlling the power receiving operation of the power receiving module 1, based on a predetermined wireless power supply scheme. The terminal operation mode setting program for the power receiving module is a program for performing power supply control and the setting of the operation mode of the portable terminal 2, in response to a control signal from the power feeder 3. The terminal operation mode setting program for the power receiving module is an example of "information processing program".

The non-volatile memory 104 is, for example, a flash memory. The non-volatile memory 104 provides, for example, a storage area for storing the information used in the execution of a program stored in the ROM 103.

The CPU 101 performs a process relating to the power receiving of wireless power supply, by executing the program stored in the ROM 103. For example, the CPU 101 executes the instructions of the operation mode of the terminal setting program for a power receiving module stored in the ROM 103.

The Bluetooth antenna 105 and the Bluetooth circuit 106 respectively are an antenna and a circuit for communicating with the power feeder 3. The wireless signal received by the Bluetooth antenna 105 is converted into an electrical signal by the Bluetooth antenna 105, and the electrical signal is output to the Bluetooth circuit 106. Next, the electrical signal is subjected to a demodulation process and a baseband process by the Bluetooth circuit 106, and the result is output to the CPU 101. When data is input from the CPU 101, a reverse process is performed, and the wireless signal is transmitted from the Bluetooth antenna 105.

The power receiving antenna 107 and the power receiving circuit 108 are an antenna and a circuit that receive power by magnetic field resonance by the magnetic field generated from the power feeder 3. The power receiving antenna 107 includes, for example, a coil and a capacitor. The power receiving circuit 108 is a circuit that includes a rectifying circuit of the power that is generated in the power receiving antenna 107, and a dc-dc converter, and the like. The power that has been processed by the power receiving circuit 108 is output to the charging circuit 111. The charging circuit 111 is a circuit for charging power input from the power receiving circuit 108 in the battery 200.

The interface circuit 109 is a circuit for performing communication with the portable terminal 2 connected to the power receiving module 1, and includes a connector with the portable terminal 2.

The terminal power state detection circuit 110 is a circuit for detecting whether the power of the portable terminal 2 connected to the power receiving module 1 is on or off. The terminal power state detection circuit 110 includes an activation circuit (not illustrated) that causing the power of the power receiving module 1 to be ON, and operates as a switch. For example, the terminal power state detection circuit 110 is connected to the power circuit 205 of the portable terminal 2. When the power of the portable terminal 2 changes from the off-state to the on-state, the voltage change is transmitted from the power circuit 205 of the portable terminal 2 to the terminal power state detection circuit 110 through the signal line. Based on the voltage change, the terminal power state detection circuit 110 sets the power of the power receiving module 1 to an on-state, through the activation circuit. Thus, power of the CPU 101 is turned on, and the operation of the power receiving module 1 is started.

Further, the terminal power state detection circuit 110 is connected to the battery 200 through a power supply path different from the other hardware configuration elements in the power receiving module 1, and is normally in a power-on state. Thus, even if the power receiving module 1 is in an off-state, it is possible for the terminal power state detection circuit 110 to detect the power state of the portable terminal 2.

Then, examples of the portable terminal 2 are smartphones, tablet terminals, mobile telephone terminals, and the like. Further, other examples of the portable terminal 2 include a portable game machine, a portable music player, or the like which includes a wireless power receiving module or is connected thereto. The portable terminal 2 is an example of "terminal".

The portable terminal 2 includes a CPU 201, a RAM 202, a non-volatile memory 203, an interface circuit 204, a power circuit 205, a display unit 206, a touch panel unit 207, an audio input and output unit 208, a wireless unit 209, and a wireless antenna 210. Further, the portable terminal 2 is connected to a removable battery 200.

The non-volatile memory 203 stores an operating system (OS), various applications, a terminal operation mode setting program for a terminal, and data such as a telephone book. The terminal operation mode setting program for the terminal is a program for setting an operation mode according to the notification from the power receiving module 1. The CPU 201 controls the portable terminal 2 by deploying the OS or the application or the like that is stored in non-volatile memory 203 in the work area of the RAM 202, and executing the expanded instruction.

The touch panel unit 207 is one of a position input device and is disposed on the surface of the display unit 206, and outputs the coordinates of the touch position in which contact is detected to the CPU 201. The touch panel unit 207 may be a touch panel of any of a capacitive type, a resistive film type, a surface acoustic wave scheme, an infrared scheme, and an electromagnetic induction scheme.

The display unit 206 is for example, a liquid crystal display (LCD). The display unit 206 displays the screen data in accordance with signals input from the CPU 201.

The wireless unit 209 is connected to the antenna 210, and converts a wireless signal received through the antenna 210 into an electrical signal so as to output the electrical signal to the CPU 201, or converts an electrical signal received from the CPU 201 into a wireless signal so as to output the wireless signal through the antenna 210. The wireless unit 209 performs a process relating to communication with the wireless base station, and performs communication in compliance with, for example, one or a plurality of schemes among wireless communication schemes such as a third-generation mobile communication system, a second-generation mobile communication system, and a Long Term Evolution (LTE).

The audio input and output unit 208 includes a speaker as an audio output device, and a microphone as the audio input device. The audio input and output unit 208 converts an audio signal received from the microphone into an electrical signal so as to output the electrical signal to the CPU 201, or converts an electrical signal received from the CPU 201 into an audio signal so as to output the audio signal to the speaker.

The interface circuit 204 is a circuit for performing communication with the power receiving module 1, and includes a connector with the power receiving module 1. The power circuit 205 is a circuit that controls the power supply to the portable terminal 2. The battery 200 is, for example, a rechargeable Lithium ion battery. The battery 200 is connected to the power receiving module 1 as well as the portable terminal 2, and supplies power to the power receiving module 1. In addition, a power circuit on the power receiving module 1 is omitted in FIG. 2.

In addition, the hardware configurations of the power receiving module 1 and the portable terminal 2 are not limited to those illustrated in FIG. 2, and a change such as addition, substitution, and deletion is possible as appropriate. For example, the portable terminal 2, in addition to the configuration illustrated in FIG. 2, may include a camera, an infrared communication unit, an IC card communication unit, and the like.

Figure 3:
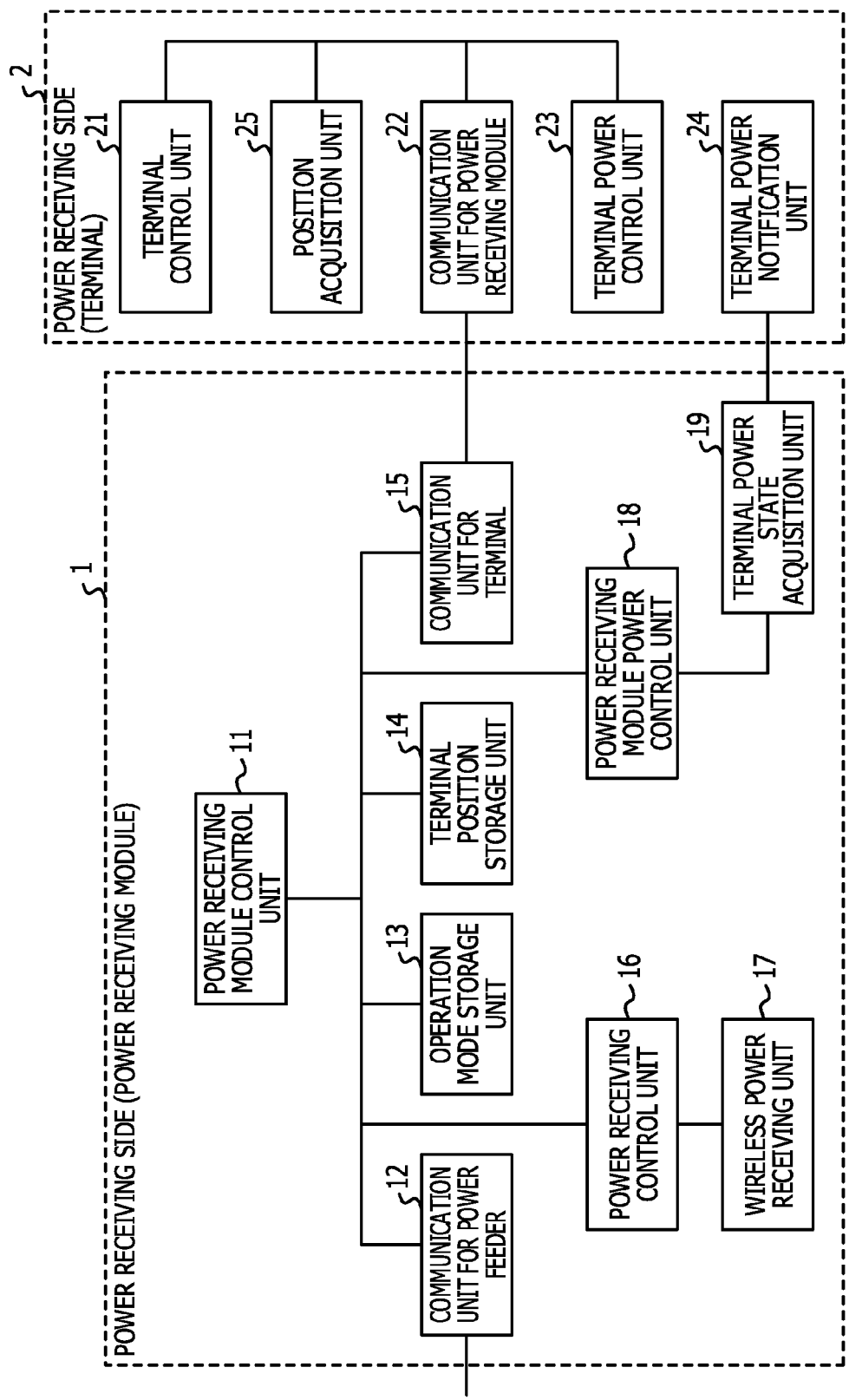
FIG. 3 is a diagram illustrating an example of a functional configuration of the power receiving module and the portable terminal.

FIG. 3 is a diagram illustrating an example of a functional configuration of the power receiving module 1 and the portable terminal 2. The power receiving module 1 includes a power receiving module control unit 11, a communication unit 12 for a power feeder, an operation mode storage unit 13, a terminal position storage unit 14, a communication unit 15 for a terminal, a power receiving control unit 16, a wireless power receiving unit 17, a power receiving module power control unit 18, and a terminal power state acquisition unit 19, as functional components. Among them, since the terminal position storage unit 14 is used in other embodiments described below, the description thereof is not performed in the first embodiment.

The communication unit 12 for a power feeder is a communication interface that communicates with the power feeder 3 through the Bluetooth antenna 105 and the Bluetooth circuit 106. The communication unit 12 for a power feeder receives a control signal from the power feeder 3. The communication unit for terminal 16 is a communication interface that communicates with the portable terminal 2 through the interface circuit 109. The communication unit 12 for a power feeder is an example of a "reception unit". The communication unit 15 for a terminal is an example of a "communication unit for terminal".

The wireless power receiving unit 17 receives power from the power feeder 3. The wireless power receiving unit 17 corresponds to the power receiving antenna 107, and the power receiving circuit 108. The power receiving control unit 16 monitors the power receiving state of the wireless power receiving unit 17 so as to monitor operation parameters of the power receiving circuit 108.

The power receiving module power control unit 18 controls ON/OFF of the power of the power receiving module 1. When the terminal power state acquisition unit 19 detects that the power of the portable terminal 2 is turned on from an off state, the power receiving module power control unit 18 turns on the power of the power receiving module 1. Further, the power receiving module control unit 18 turns off the power of the power receiving module 1 in response to the instruction from the power receiving module control unit 11. The power receiving module power control unit 18 corresponds to, for example, an activation circuit (not illustrated), and a power cut program stored in the ROM 103. When the power of the power receiving module 1 is turned on, the activation circuit operates as the power receiving module power control unit 18. When the power of the power receiving module 1 is turned off, the CPU 101 as the power receiving module power control unit 18 executes the power cut program stored in the ROM 103. The power receiving module power control unit 18 allows the power receiving module 1 to perform power cut independently of the portable terminal 2. In other words, even if the power of the portable terminal 2 is turned off from an on state, the power receiving module 1 continuously maintains the power in an on state. The power receiving module power control unit 18 is an example of the "power-off control unit".

The terminal power state acquisition unit 19 corresponds to the terminal power state detection circuit 110, and detects the on and off state of the power, and a change in the power state of the portable terminal 2. The terminal power state acquisition unit 19 outputs the power state of the portable terminal 2 and a change in the power state of the portable terminal 2, to the power receiving module power control unit 18.

The power receiving module control unit 11, the operation mode storage unit 13, and terminal position storage unit 14 are functional configurations to be implemented by the CPU 101 of the power receiving module 1 executing the operation mode of the terminal setting program for a power receiving module stored in the ROM 103.

The power receiving module control unit 11 performs the power control and the setting of the operation mode of the portable terminal 2 in response to the control signal from the power feeder 3, in the first embodiment. The process of the power receiving module control unit 11 will be described below in detail. The power receiving module control unit 11 is an example of the "control unit".

The operation mode storage unit 13 and the terminal position storage unit 14 are formed in the storage area of the non-volatile memory 104. When the power of the portable terminal 2 is turned on at the next time, the operation mode notified to the portable terminal 2 by the power receiving module control unit 11 is stored in the operation mode storage unit 13. In the first embodiment, the operation mode to be notified at the time of the next activation of the portable terminal 2 is designated by the control signal from the power feeder 3. The terminal position storage unit 14 will be described in the second embodiment described later.

Next, the portable terminal 2 includes a terminal control unit 21, a communication unit 22 for a power receiving module, a terminal power control unit 23, a terminal power notification unit 24, and position acquisition unit 25, as functional components. The communication unit 22 for a power receiving module is a communication interface for communicating with the power receiving module 1 through the interface circuit 204.

The terminal power control unit 23 controls ON/OFF of the power of the portable terminal 2, in response to the instruction of the terminal control unit 21. The terminal power control unit 23 corresponds to an activation circuit (not illustrated) and a power cut program. The terminal power notification unit 24 corresponds to a signal line connecting the power circuit 205 and the terminal power state detection circuit 110 of the power receiving module 1, and notifies the power-on or off of the terminal. For example, in a case of a power-on state, the terminal power notification unit 24 notifies the power-on of the terminal, by causing a current to flow from the power circuit 205 to the terminal power state detection circuit 110 of the power receiving module 1.

The terminal control unit 21 is an example of a functional configuration to be implemented by the CPU 201 executing the operation mode of the terminal setting program for a terminal stored in the non-volatile memory 203. The terminal control unit 21 sets the operation mode according to the notification from the power receiving module 1, or notifies the acknowledgement for the power-off with respect to the notification of the power-off from the power receiving module 1. If receiving the notification of the power-off from the power receiving module 1, the terminal control unit 21 instructs the terminal power control unit 23 to turn off the power. In addition, the position acquisition unit 25 will be described in the second embodiment below in detail.

Configuration of Transmitting-Side Device

Figure 4:
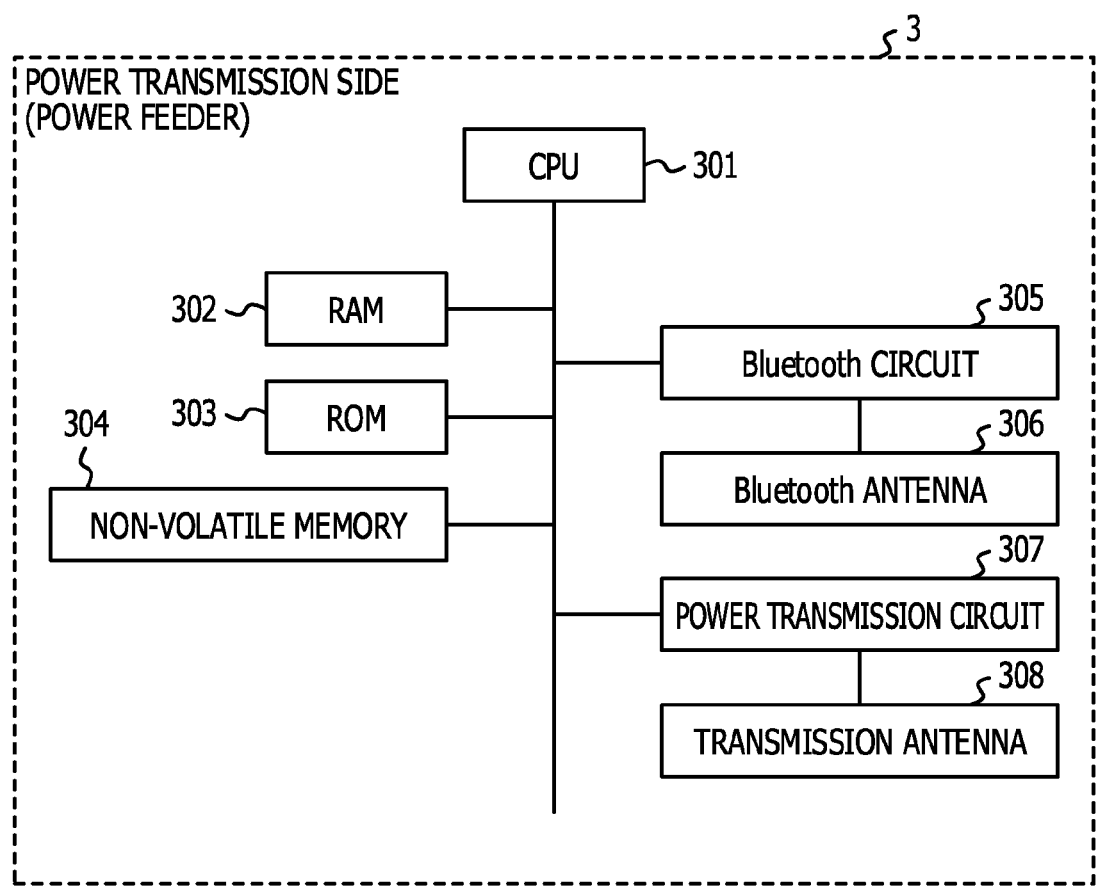
FIG. 4 is a diagram illustrating an example of a hardware configuration of a power feeder.

FIG. 4 is a diagram illustrating an example of a hardware configuration of the power feeder 3. The power feeder 3 is, for example, a wireless power supply unit of a magnetic field resonance system which is installed near the armrest of the seat in the airplane, inside the folding table attached to the seat, on a wall, on a ceiling, and the like. The power feeder 3 includes a CPU 301, a RAM 302, a ROM 303, a non-volatile memory 304, a Bluetooth circuit 305, a Bluetooth antenna 306, a power transmission circuit 307, and a power transmission antenna 308. The power feeder 3 is an example of the "power supply device".

The CPU 301, the RAM 302, the ROM 303, and the non-volatile memory 304 are as described in the hardware configuration of the power receiving module 1. A terminal operation mode setting program for a power feeder is stored in the non-volatile memory 304 of the power feeder 3. The terminal operation mode setting program for the power feeder is a program for transmitting a control signal to the power receiving module 1 used in wireless power supply by containing the setting of the power state, the operation mode, and the like of the portable terminal 2 in the control signal, in the first embodiment.

The Bluetooth circuit 305 and Bluetooth antenna 306 are respectively used for transmitting a control signal to the power receiving module 1. The power transmission antenna 308 includes a coil and a capacitor, and the power transmission circuit 307 is a circuit including a high frequency amplifier and a matching circuit for generating a magnetic field in the power transmission antenna 308.

Figure 5:
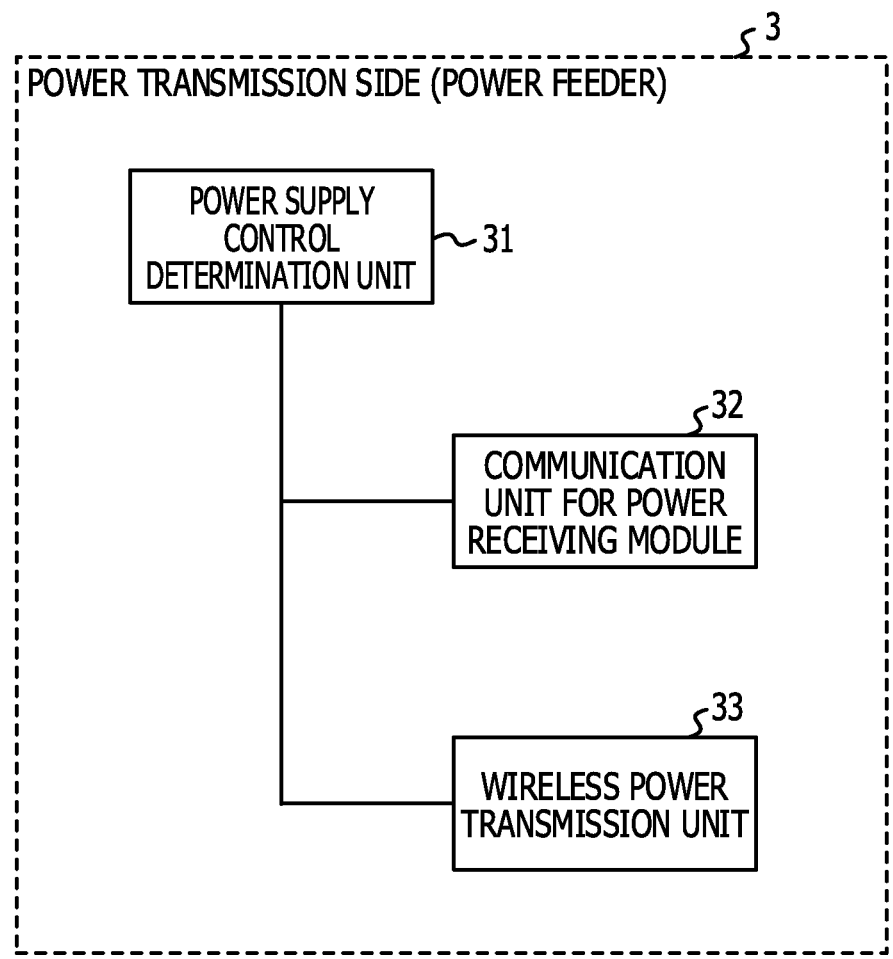
FIG. 5 is a diagram illustrating an example of a functional configuration of the power feeder.

FIG. 5 is a diagram illustrating an example of a functional configuration of the power feeder 3. The power feeder 3 includes a power supply control determination unit 31, a communication unit 32 for a power receiving module, and a wireless power transmission unit 33, as functional components. The communication unit 32 for a power receiving module is an interface which transmits a control signal to the power receiving module 1 through the Bluetooth circuit 305 and the Bluetooth antenna 306. The wireless power transmission unit 33 corresponds to the power transmission circuit 307 and the power transmission antenna 308, and transmits power in a wireless power supply scheme.

The power supply control determination unit 31 is a function implemented by the CPU 301 executing the operation mode of the terminal setting program for a power feeder. The power supply control determination unit 31 determines the amount of power to be supplied to the power receiving side, and processes control information with the power receiving side. Further, the power supply control determination unit 31 outputs a control signal by containing the power state, the operation mode, and the like of the portable terminal 2 in the control signal, by, for example, a control device (not illustrated) that controls a plurality of power feeders 3 in an airplane or an operation input in accordance with the situation by an administrator through an operating system. For example, when an airplane is prepared for takeoff, a signal is transmitted to each power feeder 3, by a predetermined operation performed by the crew of the airplane or an automatic operation of the airplane operating system, and the power supply control determination unit 31 transmits a control signal containing turning off the power of the portable terminal 2 and the airplane mode setting.

Details of Control Message

The information in the control signal that is transmitted from the power feeder 3 to the receiving module 1 in the wireless power supply scheme, hereinafter, is referred to as a control message. Examples of the control message are a terminal control message and a power supply control message. Among them, the terminal control message is used in the first embodiment. The terminal control message is an example of "a predetermined control signal".

FIG. 6 is a diagram illustrating an example of information contained in the terminal control message. The terminal control message is used for controlling the power of the terminal and the operation mode.

The terminal control message contains items, for example, a "message type", a "terminal power control", an "operation mode of terminal", and an "operation mode of the terminal of the next activation". The "terminal power control" refers to a power state which is indicated for the portable terminal 2, for example, ON, OFF, and Don't Care.

When the "terminal power control" in the terminal control message is "ON", it is instructed to turn on the power of the portable terminal 2. When the "terminal power control" in the terminal control message is "OFF", it is instructed to turn off the power of the portable terminal 2. When the "terminal power control" in the terminal control message is "Don't Care", it is indicated that the portable terminal 2 is in a power-on state or a power-off state.

The "operation mode of terminal" in the terminal control message is the operation mode of the portable terminal 2. In the first embodiment, there are operation modes of a normal mode, a silent mode, a drive mode, and an airplane mode. The normal mode is a mode in which there is no limitation in a ringtone and transmission of radio waves. The silent mode is a mode in which the ringtone of the portable terminal 2 is invalid. The drive mode is a mode in which if there is an incoming call in the portable terminal 2, a message notifying that the user is driving is automatically transmitted to the other party. The airplane mode is a mode in which radio waves are not emitted by the portable terminal 2.

Any of the normal mode, the silent mode, the drive mode, the airplane mode, and "Don't Care" is stored in the "operation mode of terminal" in the terminal control message, in the first embodiment. When the "terminal power control" in the terminal control message is "Don't Care", it is indicated that the portable terminal 2 is in any operation mode.

The "operation mode of the terminal of the next activation" in the terminal control message is a mode for the next activation of the portable terminal 2. The "operation mode of the terminal of the next activation" in the terminal control message stores any of the normal mode, the silent mode, the drive mode, the airplane mode, and Don't Care, in the first embodiment.

The terminal control message is transmitted in a data format and a communication method according to the provision of Bluetooth adopted in the A4WP which is a technical standard of a wireless power supply scheme. Further, the types of information to be stored in respective items are defined in advance by the administrator of the wireless power supply system 100.

Flow of Process

Figure 7A:
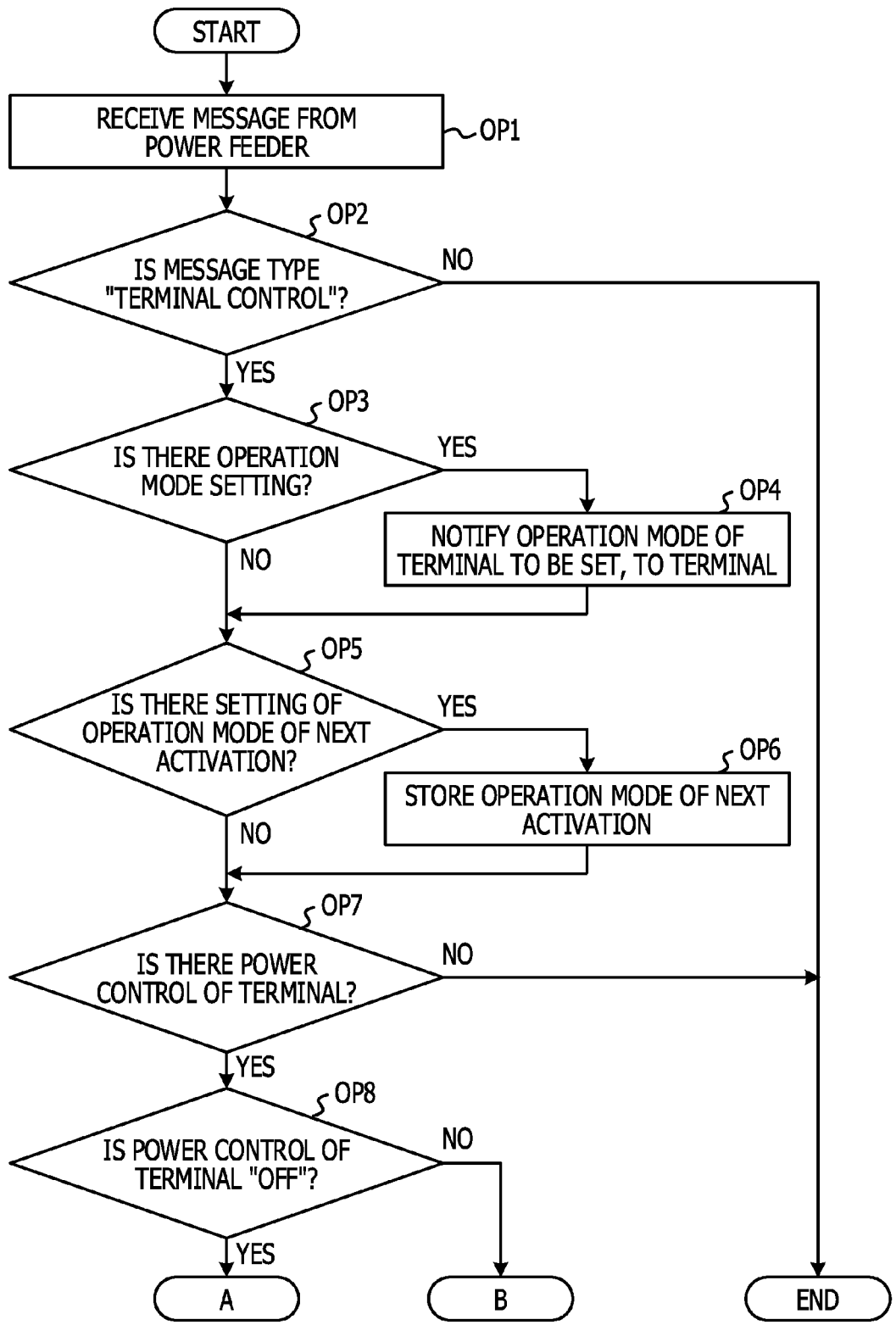
FIG. 7A is an example of a flowchart of a process of the power receiving module control unit of the power receiving module, according to the first embodiment.
Figure 7B:
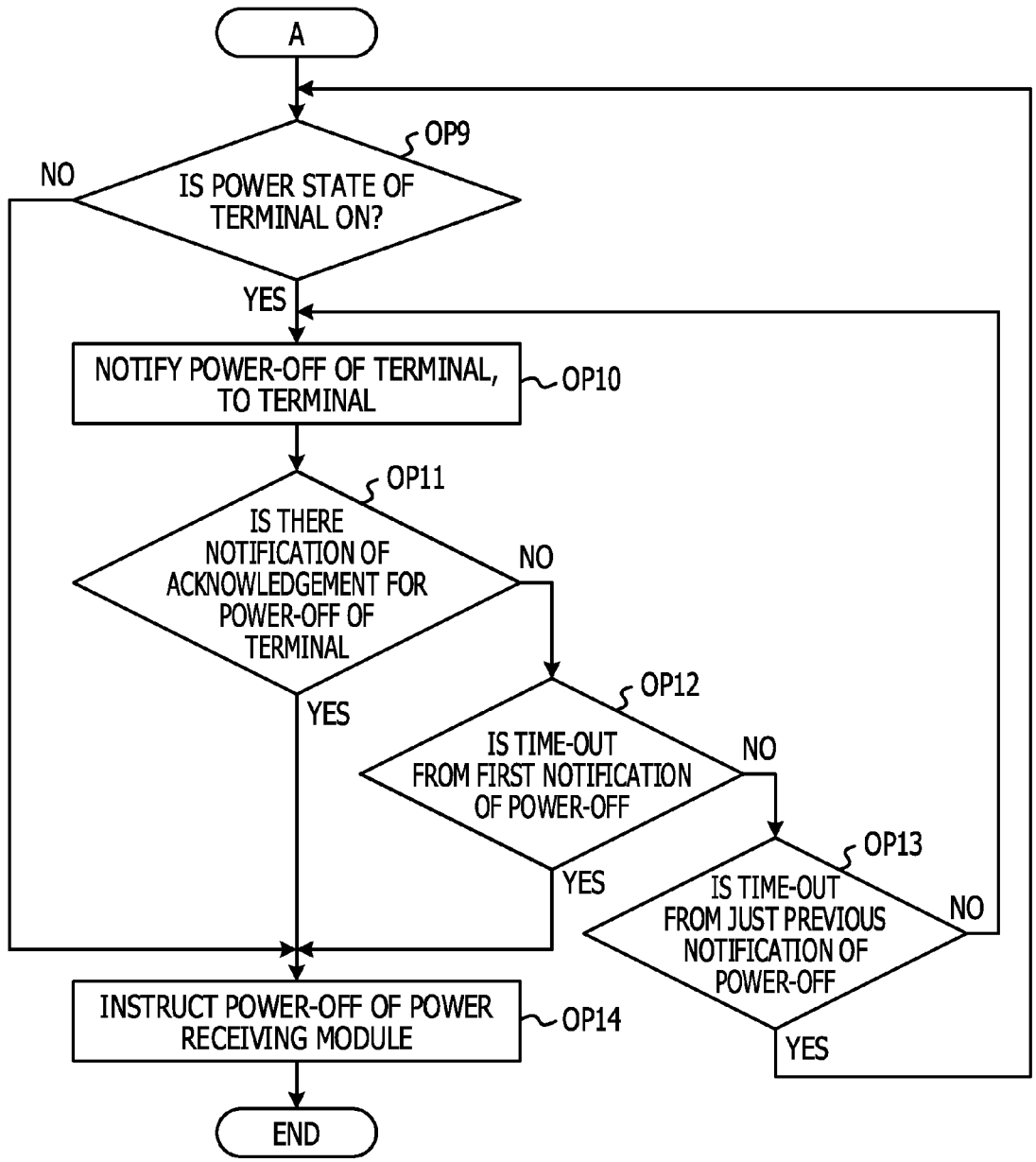
FIG. 7B is an example of a flowchart of a process of the power receiving module control unit of the power receiving module, according to the first embodiment.
Figure 7C:
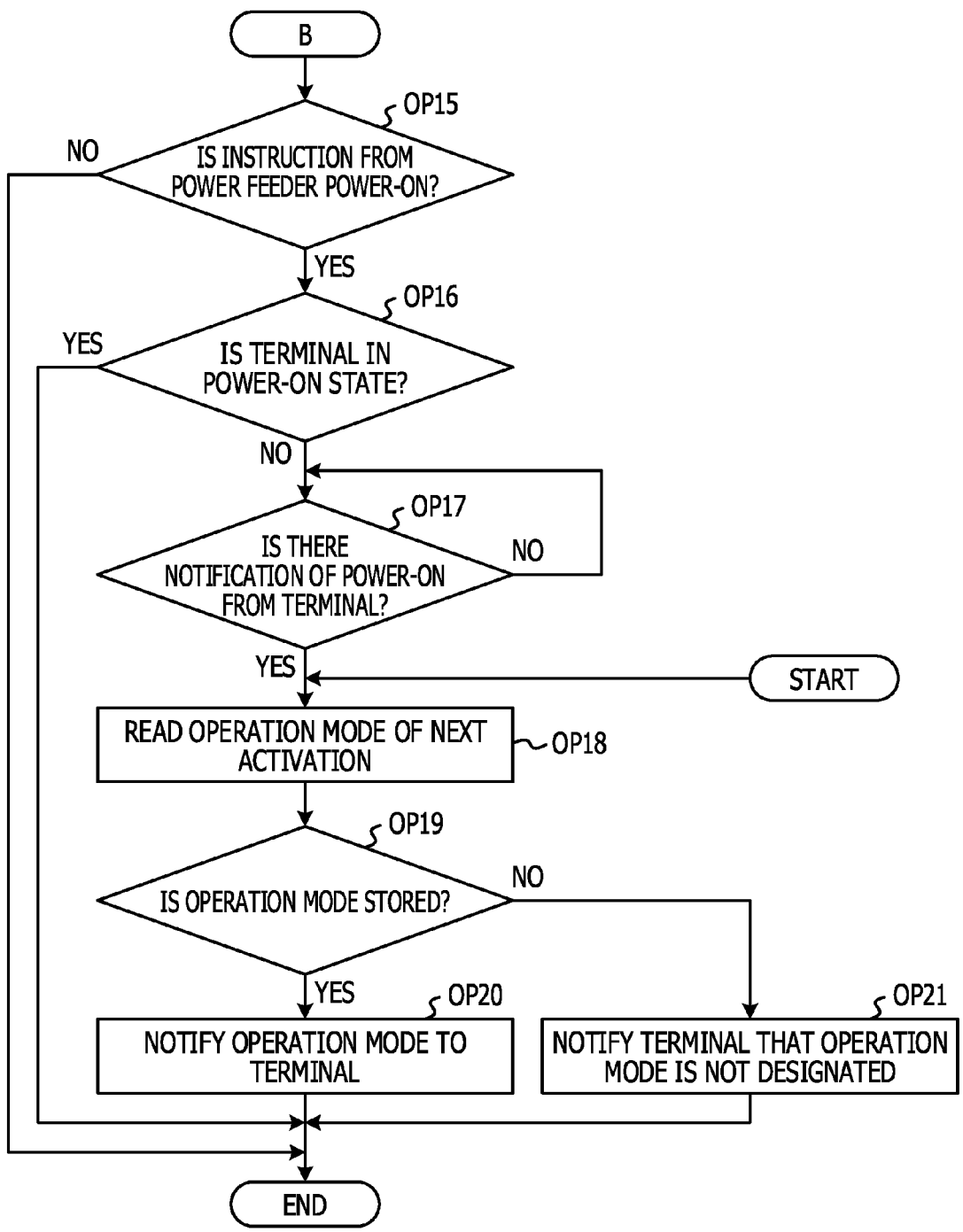
FIG. 7C is an example of a flowchart of a process of the power receiving module control unit of the power receiving module, according to the first embodiment.

FIGS. 7A to 7C are an example of a flowchart of the process of the power receiving module control unit 11 of the power receiving module 1 corresponding to the first embodiment. If the control message is input from the communication unit 12 for a power feeder of the power receiving module 1 to the power receiving module control unit 11, the processes illustrated in FIGS. 7A to 7C are started.

In OP1, the power receiving module control unit 11 receives the control message from the power feeder 3 through the communication unit 12 for a power feeder. Next, the process proceeds to OP2.

In OP2, the power receiving module control unit 11 determines whether or not the "message type" in the control message is the "terminal control". When the "message type" in the control message is not the "terminal control" (OP2: NO), the process illustrated in FIG. 7A is completed. When the "message type" in the control message is the "terminal control" (OP2: YES), the process proceeds to OP3.

In OP3, the power receiving module control unit 11 determines whether or not there is a setting to the "operation mode of terminal" in the terminal control message. When there is not the setting to the "operation mode of terminal" in the terminal control message ("Don't Care") (OP3: NO), the process proceeds to OP5.

When there is the setting to the "operation mode of terminal" in the terminal control message (OP3: YES), the process proceeds to OP4. In OP4, the power receiving module control unit 11 notifies the portable terminal 2 of the operation mode indicated by the "operation mode of terminal" in the terminal control message, through the communication unit 15 for a terminal. At this time, when the power state of the portable terminal 2 is ON, the portable terminal 2 sets the operation mode according to the notification. When the power state of the portable terminal 2 is OFF, the notification is discarded in the communication unit 15 for a terminal. Next, the process proceeds to OP5.

In OP5, the power receiving module control unit 11 determines whether or not there is a setting to the "operation mode of the next activation" in the terminal control message. When there is the setting to the "operation mode of the next activation" in the terminal control message (OP5: YES), the process proceeds to OP6. When there is not the setting to the "operation mode of the next activation" in the terminal control message ("Don't Care") (OP5: NO), the process proceeds to OP7.

In OP6, the power receiving module control unit 11 stores the operation mode indicated by the "operation mode of the next activation" in the terminal control message in the operation mode storage unit 13. Next, the process proceeds to OP7.

In OP7, the power receiving module control unit 11 determines whether or not there is a setting to the "power control" in the terminal control message. When there is the setting to the "power control" in the terminal control message (OP7: YES), the process proceeds to OP8. When there is not the setting to the "power control" in the terminal control message (OP7: NO), the process illustrated in FIG. 7A is completed.

In OP8, the power receiving module control unit 11 determines whether or not the "power control" in the terminal control message is "OFF". When the "power control" in the terminal control message is "OFF" (OP8: YES), the process proceeds to OP9. When the "power control" in the terminal control message is not "OFF" (OP8: NO), the process proceeds to OP15.

Since the "power control" in the terminal control message is "OFF", in OP9, the power receiving module control unit 11 determines whether or not the power state of the portable terminal 2 is ON. This determination is performed by determining whether or not there is a notification from the terminal power state acquisition unit 19, in other words, a signal is input from the terminal power state detection circuit 110 to the CPU 101. When the power state of the portable terminal 2 is ON (OP9: YES), the process proceeds to OP10. When the power state of the portable terminal 2 is already OFF (OP9: NO), the process proceeds to OP14.

In OP10, the power receiving module control unit 11 notifies the power-off to the portable terminal 2 through the communication unit 15 for a terminal. Next, the process proceeds to OP11.

In OP11, the power receiving module control unit 11 waits for the reception of the notification of the acknowledgement for the power-off from the portable terminal 2, through communication unit 15 for a terminal. When the notification of the acknowledgement for the power-off is received from the portable terminal 2 (OP11: YES), the process proceeds to OP14. When the notification of the acknowledgement for the power-off is not received from the portable terminal 2 (OP11: NO), the process proceeds to OP12.

In OP12, the power receiving module control unit 11 determines whether or not it is time-out from the first notification of the power-off for the portable terminal 2 in OP10. The time-out time from the first notification of the power-off for the portable terminal 2 is, for example, ten seconds. When it is time-out from the first notification of the power-off for the portable terminal 2 (OP12: YES), the process proceeds to OP14. When it is not time-out from the first notification of the power-off for the portable terminal 2 (OP12: NO), the process proceeds to OP13.

In OP13, the power receiving module control unit 11 determines whether or not it is time-out from the just previous notification of the power-off for the portable terminal 2 in OP10. The time-out time from the just previous notification of the power-off for the portable terminal 2 is, for example, one second. When it is time-out from the just previous notification of the power-off for the portable terminal 2 (OP13: YES), the process proceeds to OP14. When it is not time-out from the previous notification of the power-off for the portable terminal 2 (OP13: NO), the process returns to OP10, and the notification of the power-off for the portable terminal 2 is again performed.

In other words, in the process illustrated in FIG. 7B, when the power receiving module control unit 11 does not receive the notification of the acknowledgement for the power-off from the portable terminal 2, the power receiving module control unit 11 transmits the notification of the power-off to the portable terminal 2 at every one second, and if ten seconds has elapsed, it is time-out, and the process proceeds to OP14.

In OP14, the power receiving module control unit 11 instructs the power receiving module power control unit 18 to turn off the power. Thereafter, the process illustrated in FIG. 7B is completed, and the power of the power receiving module 1 is cut by the power receiving module power control unit 18.

In OP15, the power receiving module control unit 11 determines whether or not the "power control" in the terminal control message is "ON". When the "power control" in the terminal control message is "ON" (OP15: YES), the process proceeds to OP16. When the "power control" in the terminal control message is neither "OFF" nor "ON" (OP15: NO), the process illustrated in FIG. 7C is completed.

Since the "power control" in the terminal control message is "ON", in OP16, the power receiving module control unit 11 determines whether or not the power of the portable terminal 2 is in an on-state. When the power of the portable terminal 2 is in the on-state (OP16: YES), the process illustrated in FIG. 7C is completed. When the power state of the portable terminal 2 is in OFF (OP16: NO), the process proceeds to OP17.

In OP17, the power of the portable terminal 2 is turned ON, and the power receiving module control unit 11 waits for an input of the notification of the power-on of the portable terminal 2 from the terminal power state acquisition unit 19. When the notification of the power-on of the portable terminal 2 is received from the terminal power state acquisition unit 19 (OP17: YES), the process proceeds to OP18. In addition, in the example illustrated in FIG. 7C, the power receiving module control unit 11 is in a standby state until the notification of the power-on of the portable terminal 2 is input from the terminal power state acquisition unit 19, but when a predetermined time notification is not input (OP17: NO), it may be time-out.

In OP18, the power receiving module control unit 11 reads the operation mode stored in the operation mode storage unit 13. Next, the process proceeds to OP19.

In OP19, the power receiving module control unit 11 whether or not the operation mode is stored in the operation mode storage unit 13. When the operation mode is stored in the operation mode storage unit 13 (OP19: YES), the process proceeds to OP20. When the operation mode is not stored in the operation mode storage unit 13 (OP19: NO), the process proceeds to OP21.

In OP20, the power receiving module control unit 11 notifies the operation mode stored in the operation mode storage unit 13 to the portable terminal 2, through the communication unit 15 for a terminal. Thereafter, the process illustrated in FIG. 7C is completed.

Since the operation mode is not stored in the operation mode storage unit 13, in OP21, the power receiving module control unit 11 notifies the portable terminal 2 that an operation mode is not designated, through the communication unit 15 for a terminal. Thereafter, the process illustrated in FIG. 7C is completed.

In addition, after the portable terminal 2 and the power receiving module 1 are both in a power-off state, the power of the portable terminal 2 is turned on, and thus the power of the power receiving module 1 is also turned on, the process of OP18 to OP22 in FIG. 7C is performed.

Figure 8:
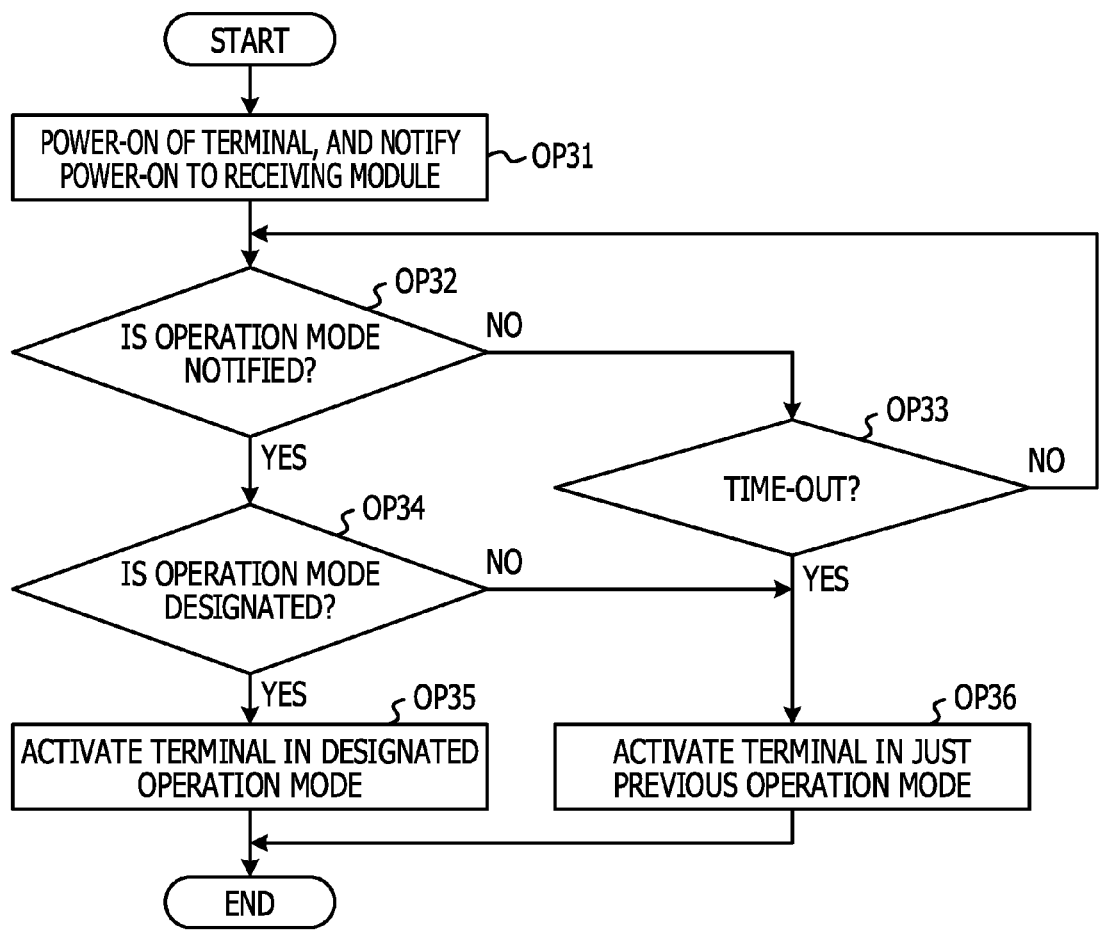

FIG. 8 is a diagram illustrating an example of a flowchart of a process when power of the portable terminal 2 is turned on. The flowchart illustrated in FIG. 8 is started when, for example, the power of the portable terminal 2 is turned on by the user.

In OP31, by the power-on of the portable terminal 2, when the terminal power notification unit 24 notifies the terminal power state acquisition unit 19 of the power receiving module 1 that the power of the portable terminal 2 is turned on. Next, the process proceeds to OP32.

In OP32, the portable terminal 2 is in a standby state for the notification of the operation mode from the power receiving module 1. When there is the notification of the operation mode from the power receiving module 1 (OP32: YES), the process proceeds to OP34. When there is not the notification of the operation mode from the power receiving module 1 (OP32: NO), the process proceeds to OP33.

In OP33, when it is time-out from the power-on without receiving a notification from the power receiving module 1 (OP33: YES), the process proceeds to OP36. The time-out time is, for example, three seconds. When it is time-out (OP33: NO), the process returns to OP32, and the portable terminal 2 is in a standby state until the notification of the operation mode is received, or time-out.

In OP34, the terminal control unit 21 determines whether or not an operation mode is specified in the notification from the power receiving module 1.

When an operation mode is specified in the notification from the power receiving module 1 (OP34: YES), the process proceeds to OP35. When the notification from the power receiving module 1 is "no specification of operation mode" (OP34: NO), the process proceeds to OP36.

In OP35, the terminal control unit 21 activates the portable terminal 2 in the operation mode specified by the notification from the power receiving module 1. Thereafter, the process illustrated in FIG. 8 is completed.

Since it is time-out from the power-on without receiving a notification from the power receiving module 1, or the operation mode is not specified in the notification from the power receiving module 1, in OP36, the terminal control unit 21 activates the portable terminal 2 in the just previous operation mode. The just previous operation mode is stored in, for example, the non-volatile memory 203. Thereafter, the process illustrated in FIG. 8 is completed.

Specific Example

Figure 9A:
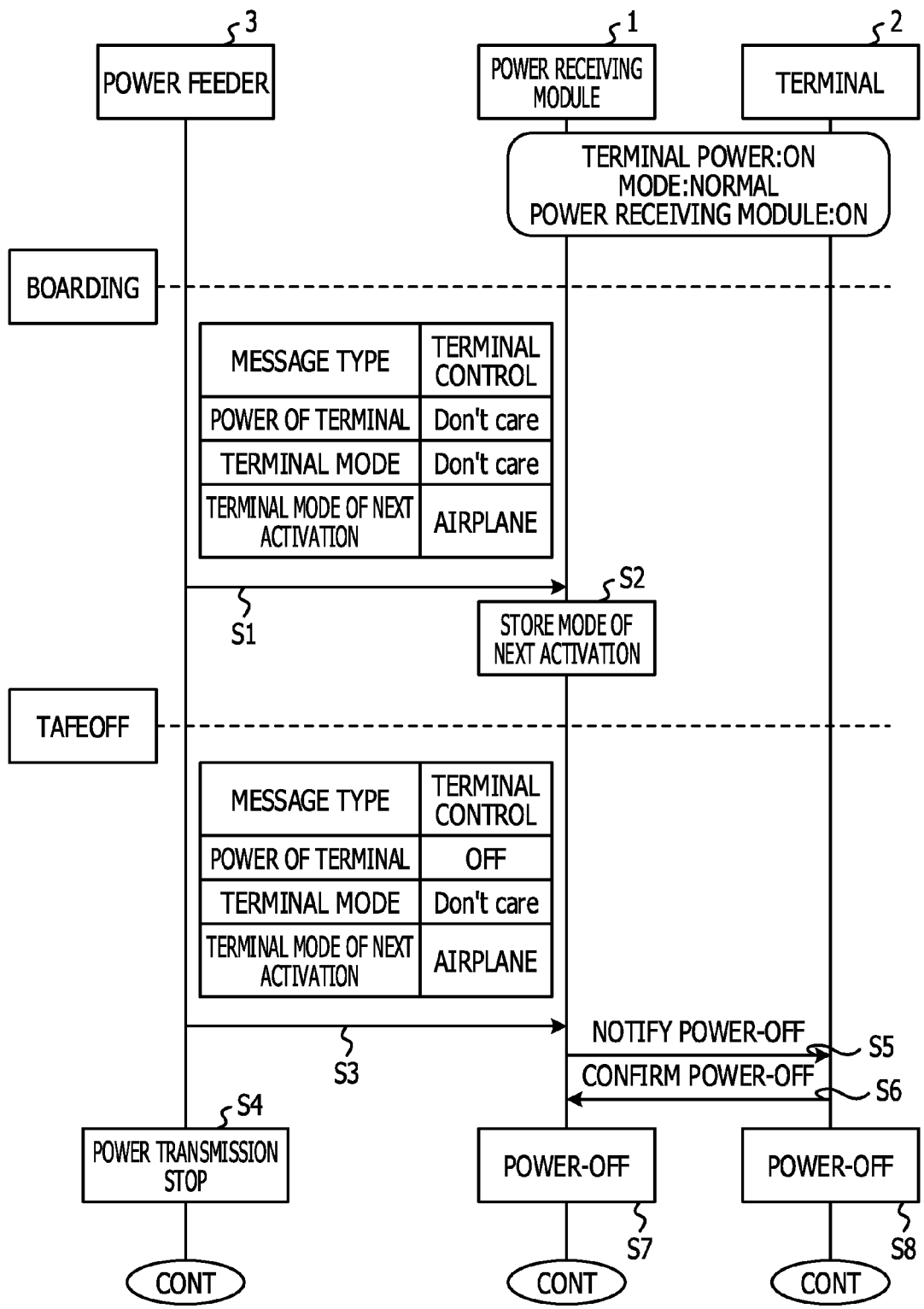
FIG. 9A is a diagram illustrating an example of a process sequence among the power receiving module, the portable terminal, and the power feeder, if a user is aboard an airplane, when the power receiving module and the portable terminal are both in the power-on state.

FIG. 9A is a diagram illustrating an example of a process sequence among the power receiving module 1, the portable terminal 2, and the power feeder 3, if the user is aboard the airplane, when the power receiving module 1 and the portable terminal 2 are both in the power-on state. Before boarding, the operation mode of the portable terminal 2 is the normal mode.

In S1, power is supplied from the power feeder 3 to the airplane, until the airplane is prepared for takeoff, and the power receiving module 1 receives a terminal control message from the power feeder 3 (in FIG. 7A, OP1). In addition, the exchange of the control signal may be started by, for example, the power feeder 3 searching for the power receiving module 1 present in a power supply area at a predetermined cycle, and transmitting a control signal to the found power receiving module 1. Otherwise, the exchange of control signal may be started by the power receiving module 1 searching for the power feeder 3, and transmitting a control signal to the found power feeder 3. The communication establishment between the power feeder 3 and the power receiving module 1 is performed in accordance with the Bluetooth specification, in the first embodiment.

In S1, the terminal control message transmitted from the power feeder 3 contains "Don't Care" in the "power control", "Don't Care" in the "operation mode of terminal", and the "airplane mode" in the "operation mode of the terminal of the next activation", respectively.

Since the "airplane mode" is set in the "operation mode of the terminal of the next activation" of the terminal control message (in FIG. 7A, OP5: YES), in S2, the power receiving module 1 stores "airplane mode" in the operation mode storage unit 13 (in FIG. 7A, OP6).

In S3, if the airplane is prepared for takeoff, the power feeder 3 transmits the terminal control message, and the power receiving module 1 receives the terminal control message (in FIG. 7A, OP1). In S3, the terminal control message transmitted from the power feeder 3 contains "OFF" in the "power control", "Don't Care" in the "operation mode of terminal", and the "airplane mode" in the "operation mode of the terminal of the next activation", respectively. In S4, the power feeder 3 stops power transmission.

In S5, since the "power control" in the terminal control message is "OFF", and the power of the portable terminal 2 is in a on state (in FIG. 7A, OP8: YES, and OP9: YES), the power receiving module 1 notifies the portable terminal 2 of the power-off (in FIG. 7B, OP10). In S6, the portable terminal 2 notifies the acknowledgement for the power-off to the power receiving module, for the notification of the power-off from the power receiving module 1.

In S7, since the notification of the acknowledgement for the power-off is received from the portable terminal 2 (in FIG. 7B, OP11: YES), the power of the power receiving module 1 is turned off (in FIG. 7B, OP14). In S8, the power of the portable terminal 2 is turned off.

If the process up to S8 is completed, the powers of the portable terminal 2 and the power receiving module 1 both are turned off. In other words, even if the user is aboard the airplane when the power of the portable terminal 2 is in an on state, if the airplane is prepared for takeoff, the powers of the portable terminal 2 and the power receiving module 1 are automatically turned off.

Figure 9B:
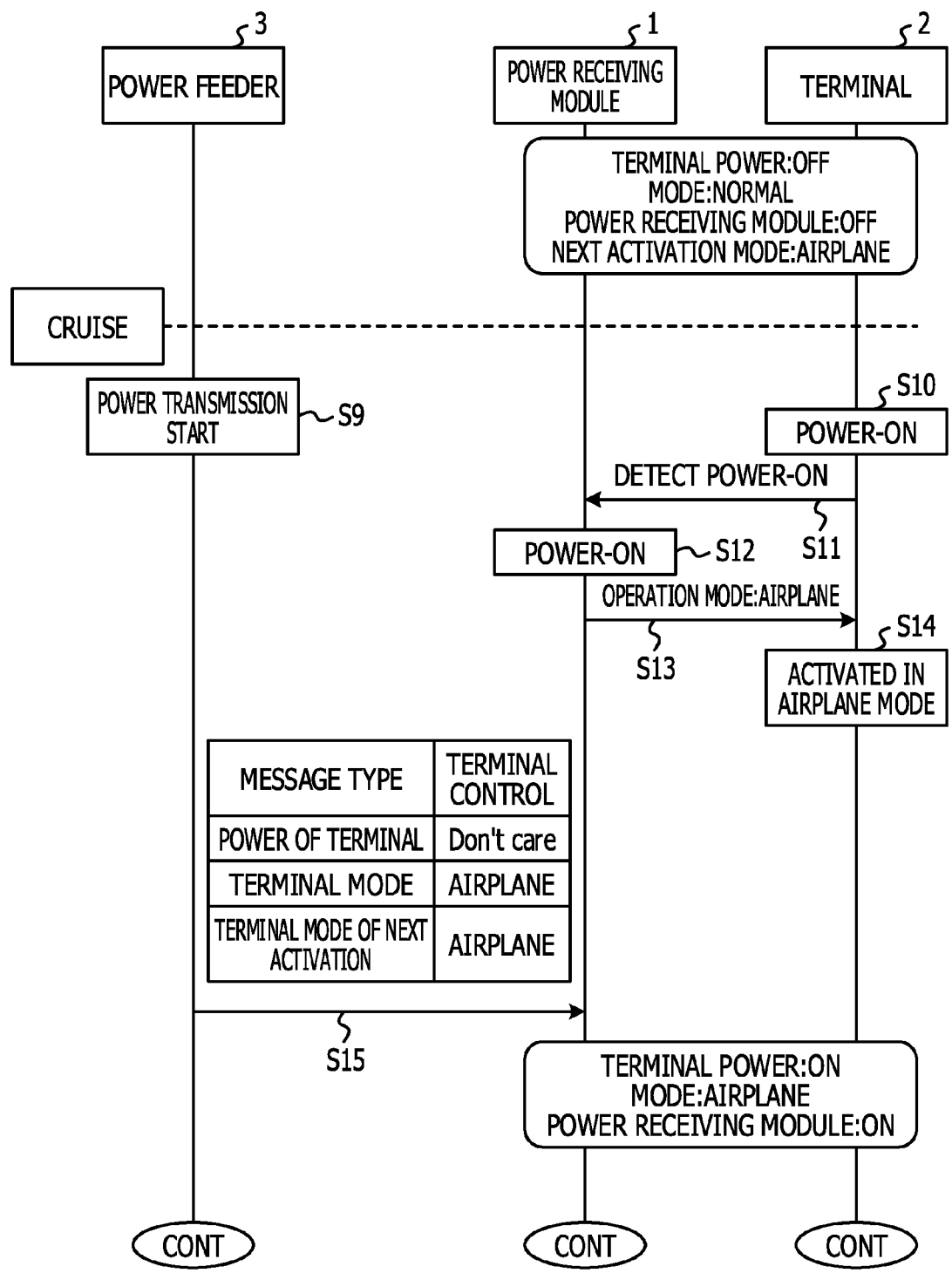
FIG. 9B is a diagram illustrating an example of a process sequence when the user turns on the power of the portable terminal, after the airplane enters a stable flight state.

FIG. 9B is a continuation of the process illustrated in FIG. 9A, and is a diagram illustrating an example of a process sequence when the user turns on the power of the portable terminal 2, after the airplane enters a stable flight state.

In S9, the airplane enters the stable flight, for example, and the power transmission of the power feeder 3 is started by a predetermined operation of the crew.

In S10, the power of the portable terminal 2 is turned on the by the user. In S11, the portable terminal 2 notifies the power receiving module 1 of the power-on (in FIG. 8, OP31). In S12, the power receiving module 1 is activated by receiving the notification of the power-on from the portable terminal 2.

Since the operation mode storage unit 13 stores the "airplane mode" (in FIG. 7C, OP19: YES), in S13, the power receiving module 1 notifies the portable terminal 2 of the "airplane mode" (in FIG. 7C, OP20).

Since the portable terminal 2 is notified of the "airplane mode" from the power receiving module 1 (in FIG. 8, OP32: YES, and OP34: YES), in S14, the portable terminal 2 is activated in the "airplane mode" (in FIG. 8, OP35).

In S15, the power receiving module 1 receives the terminal control message from the power feeder 3 (in FIG. 7A, OP1 and OP2: YES). The terminal control message received in S15 contains "Don't Care" in the "power control", "airplane mode" in the "operation mode of terminal", and the "airplane mode" in the "operation mode of the terminal of the next activation", respectively.

At the time of S15, since the portable terminal 2 is in a power-on state, and the airplane mode, a change in the power state and the operation mode of the portable terminal 2 is not performed due to the reception of the terminal control message.

If the process of S14 is completed, the portable terminal 2 is activated in the airplane mode. In other words, while the airplane is cruising, if the user turns on the power of the portable terminal 2, the portable terminal 2 is automatically activated in the operation mode to be requested from the airplane side.

Figure 9C:
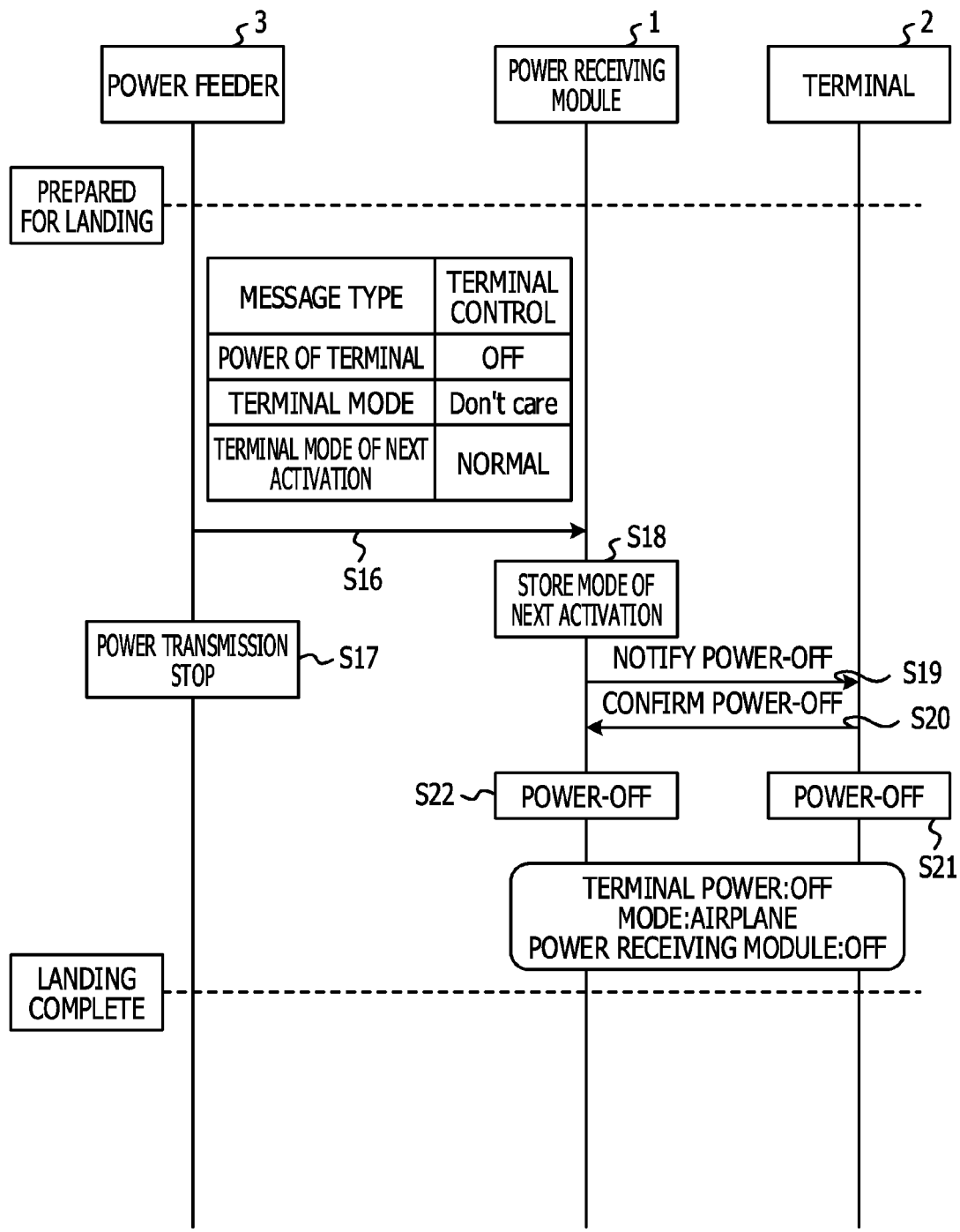
FIG. 9C is a diagram illustrating an example of a process sequence when the airplane is prepared for landing.

FIG. 9C is a continuation of the process illustrated in FIG. 9B, and is a diagram illustrating an example of a process sequence when the airplane is prepared for landing.

In S16, if the airplane is prepared for landing, the power feeder 3 transmits the terminal control message, the power receiving module 1 receives the terminal control message (in FIG. 7A, OP1). In S16, the terminal control message transmitted from the power feeder 3 contains, for example, "OFF" in the "power control", "Don't Care" in the "operation mode of terminal", and the "normal mode" in the "operation mode of the terminal of the next activation", respectively. In S17, the power feeder 3 stops the power transmission.

Since the "normal mode" is set in "the operation mode of the next activation" in the terminal in the terminal control message (in FIG. 7A, OP5: YES), in S18, the power receiving module 1 stores the "normal mode" in the operation mode storage unit 13 (in FIG. 7A, OP6).

Since the "power control" in the terminal control message is "OFF", and the portable terminal 2 is in a power-on state (in FIG. 7A, OP8: YES and OP9: YES), in S19, the power receiving module 1 notifies the power-off to the portable terminal 2 (in FIG. 7B, OP10). In S20, the portable terminal 2 notifies the power receiving module of an acknowledgement for the power-off, with respect to the notification of the power-off from the power receiving module 1. In S21, the power of the portable terminal 2 is turned off.

Since the power-off is received from the portable terminal 2 (in FIG. 7B, OP11: YES), in S22, the power of the power receiving module 1 is turned OFF (in FIG. 7B, OP14).

If the process of S22 is completed, the powers of the portable terminal 2 and the power receiving module 1 both are turned off. In other words, even if the user turns on the power of the portable terminal 2 while the airplane is cruising, when the airplane is prepared for landing, the powers of the portable terminal 2 and the power receiving module 1 are automatically turned off.

In addition, after the user gets off the airplane, the user turns on the power of the portable terminal 2, the portable terminal 2 receives the notification of the "normal mode" which is the operation mode stored in the operation mode storage unit 13 from the power receiving module 1 (in FIG. 7C, OP18, OP19: YES, and OP20), and is activated in the normal mode (in FIG. 8, OP32: YES, OP34: YES, and OP35).

Figure 10:
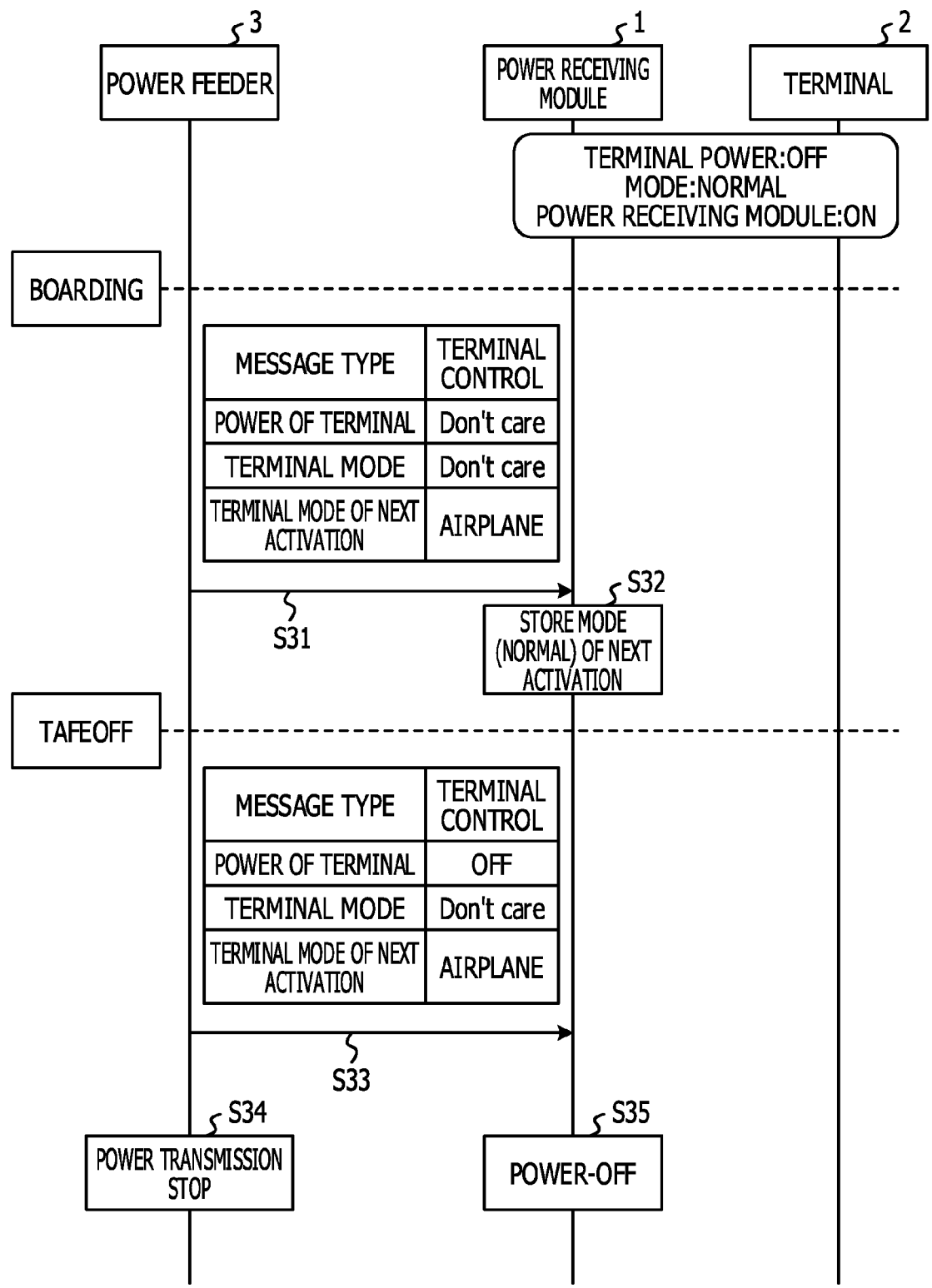
FIG. 10 is a diagram illustrating an example of a process sequence among the power receiving module, the portable terminal, and the power feeder, when the portable terminal is in the power-off state, the power receiving module is in the power-on state, and the user is aboard the airplane.

FIG. 10 is a diagram illustrating an example of a process sequence among the power receiving module 1, the portable terminal 2, and the power feeder 3, when the portable terminal 2 is in a power-off state, the power receiving module 1 is in a power-on state, and the user is aboard the airplane. Even if the power of the portable terminal 2 is turned off by the user, the power receiving module 1 maintains the power-on state. Before boarding, the operation mode of the portable terminal 2 is the normal mode.

In S31, the power receiving module 1 receives the terminal control message from the power feeder 3 (in FIG. 7A, OP1). In S31, the terminal control message transmitted from the power feeder 3 contains "Don't Care" in the "power control", "Don't Care" in the "operation mode of terminal", and the "airplane mode" in the "operation mode of the terminal of the next activation", respectively.

Since the "airplane mode" is set in the "operation mode of the terminal of the next activation" of the terminal control message (in FIG. 7A, OP5: YES), in S32, the power receiving module 1 stores "airplane mode" in the operation mode storage unit 13 (in FIG. 7A, OP6).

In S33, if the airplane is prepared for takeoff, the power feeder 3 transmits the terminal control message, and the power receiving module 1 receives the terminal control message (in FIG. 7A, OP1). In S33, the terminal control message transmitted from the power feeder 3 contains "OFF" in the "power control", "Don't Care" in the "operation mode of terminal", and the "airplane mode" in the "operation mode of the terminal of the next activation", respectively. In S34, the power feeder 3 stops the power transmission.

Since the "power control" in the terminal control message is "OFF", and the portable terminal 2 is in a power-off state (in FIG. 7A, OP8: YES, FIG. 7B, and OP9: NO), in S35, the power receiving module 1 turns off the power of the power receiving module 1 (in FIG. 7B, OP14).

If the process of S35 is completed, the powers of the portable terminal 2 and the power receiving module 1 both are turned off. Thereafter, when the airplane enters the stable flight and the user turns on the power of the portable terminal 2, since the "airplane mode" is stored in the operation mode storage unit 13 of the power receiving module 1, similar to FIG. 9B, the portable terminal 2 is activated in the airplane mode. In other words, even if the user is aboard the airplane, when the portable terminal 2 is in a power-off state, the power receiving module is in a power-on state, and the operation mode is the normal mode, if the operation mode is changed to the airplane mode and the power of the portable terminal 2 is turned on by the user while the airplane is cruising, the portable terminal 2 is automatically activated in the airplane mode.

Operation and Effect of First Embodiment

In the first embodiment, the power receiving module 1 can automatically change the power state and the operation mode of the portable terminal 2, depending on the situation, by using the control signal used in the wireless power supply scheme. Further, since the power-off control of the power receiving module 1 corresponding to the wireless power supply scheme is performed independently of the power-off control of the portable terminal 2, even if the power of the portable terminal 2 is turned off from the on state by the user, the power receiving module 1 maintains the power-on state. According to the first embodiment, even if the portable terminal 2 is in a power-off state, when the power receiving module 1 is in a power-on state, it is possible to change the operation mode of the portable terminal 2, and when the portable terminal 2 is activated at the next time, the portable terminal 2 may be activated in the operation mode depending on a situation.

Further, in a case of the wireless power supply of the magnetic field resonance scheme, even if the power feeder 3 and the power receiving module 1 are separated away a few tens of centimeters to a few meters, it is possible to perform the exchange of a control signal and supply power. Thus, for example, even in a state where the portable terminal 2 is in a bag, it is possible to perform the power control and the setting of operation mode of the portable terminal 2. Therefore, according to the first embodiment, without giving a troublesome to the user, it is possible to perform the power control and the setting of the operation mode of the portable terminal 2.

Variation of First Embodiment

In the first embodiment, the terminal control message contains the power-on or off state and the operation mode of the portable terminal 2, and the power receiving module 1 performs the power control and the setting of the operation mode of the portable terminal 2, based on the information contained in the terminal control message. In the modification example, the terminal control message does not contain the power-on or off state and the operation mode, but contains information indicating an environmental change, and the power receiving module 1 determines the power-on or off state and the operation mode of the portable terminal 2, based on the information indicating an environmental change.

In the present modification example, the hardware and functional configurations of the power receiving module 1, the portable terminal 2, and the power feeder 3 are the same as those in the first embodiment. In the present modification example, the terminal control message does not contain items of the "power control", the "operation mode of terminal", the "operation mode of the terminal of the next activation" illustrated in FIG. 6, but instead thereof, contains an item of "environmental change information". Examples of the "environmental change information" include "takeoff", and "landing".

When the "environmental change information" in the received terminal control message is "takeoff", the power receiving module control unit 11 of the power receiving module 1 determines the power-off of the portable terminal 2 and the operation mode of the next activation of the portable terminal 2 as "airplane mode". Further, when the "environmental change information" in the received terminal control message is "landing", the power receiving module control unit 11 determines the power-off of the portable terminal 2 and the operation mode of the next activation of the portable terminal 2 as "normal mode".

Figure 11:
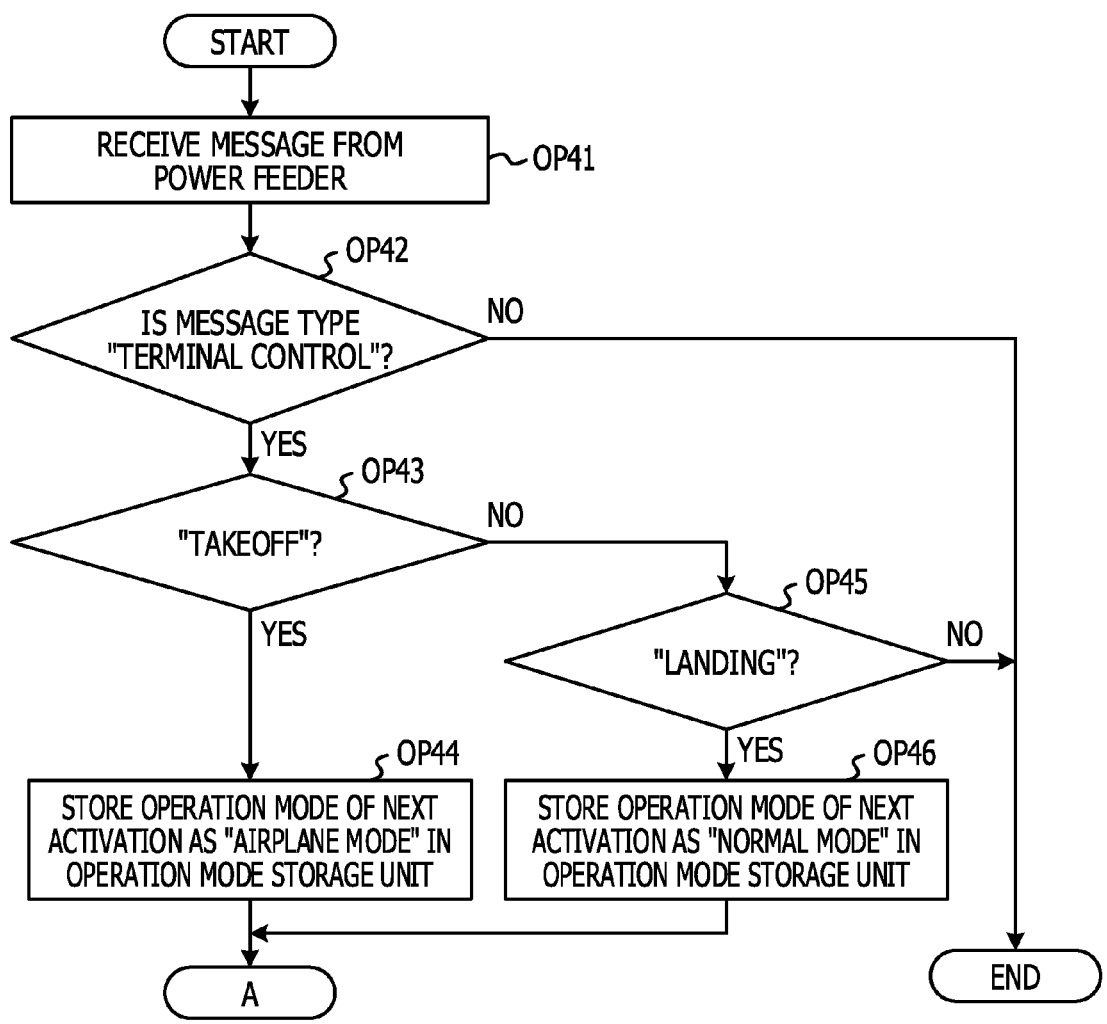
FIG. 11 is an example of a flowchart of a process of the power receiving module control unit, according to a modification example of the first embodiment.

FIG. 11 is an example of a flowchart of a process of the power receiving module control unit 11 according to the modification example of the first embodiment. If the control message is received from the communication unit 12 for a power feeder of the power receiving module 1 to the power receiving module control unit 11, the process illustrated in FIG. 11 is started.

In OP41, the power receiving module control unit 11 receives the control message from the power feeder 3, through the communication unit 12 for a power feeder. Next, the process proceeds to OP42.

In OP42, the power receiving module control unit 11 determines whether or not the "message type" in the control message is "terminal control". When the "message type" in the control message is not "terminal control" (OP42: NO), the process illustrated in FIG. 11 is completed. When the "message type" in the control message is "terminal control" (OP42: YES), the process proceeds to OP43.

In OP43, the power receiving module control unit 11 determines whether or not the "environmental change information" in the terminal control message is "takeoff". When the "environmental change information" in the terminal control message is "takeoff" (OP43: YES), the process proceeds to OP44.

In OP44, the power receiving module control unit 11 stores "airplane mode" as the operation mode of the next activation of the portable terminal 2, in the operation mode storage unit 13. Next, the process proceeds to OP9 in FIG. 7B, the powers of the portable terminal 2 and the power receiving module 1 are turned off, the processes illustrated in FIGS. 11 and 7B are completed.

In OP43, when the "environmental change information" in the terminal control message is not "takeoff" (OP43: NO), the process proceeds to OP45. In OP45, the power receiving module control unit 11 determines whether or not the "environmental change information" in the terminal control message is "landing". When the "environmental change information" in the terminal control message is not "landing" (OP45: NO), the process of illustrated in FIG. 11 is completed. When the "environmental change information" in the terminal control message is "landing" (OP45: YES), the process proceeds to OP46.

In OP46, the power receiving module control unit 11 stores "normal mode" as the operation mode of the next activation of the portable terminal 2, in the operation mode storage unit 13. Next, the process proceeds to OP9 in FIG. 7B, the powers of the portable terminal 2 and the power receiving module 1 are turned off, and the processes illustrated in FIGS. 11 and 7B are completed.

Figure 12:
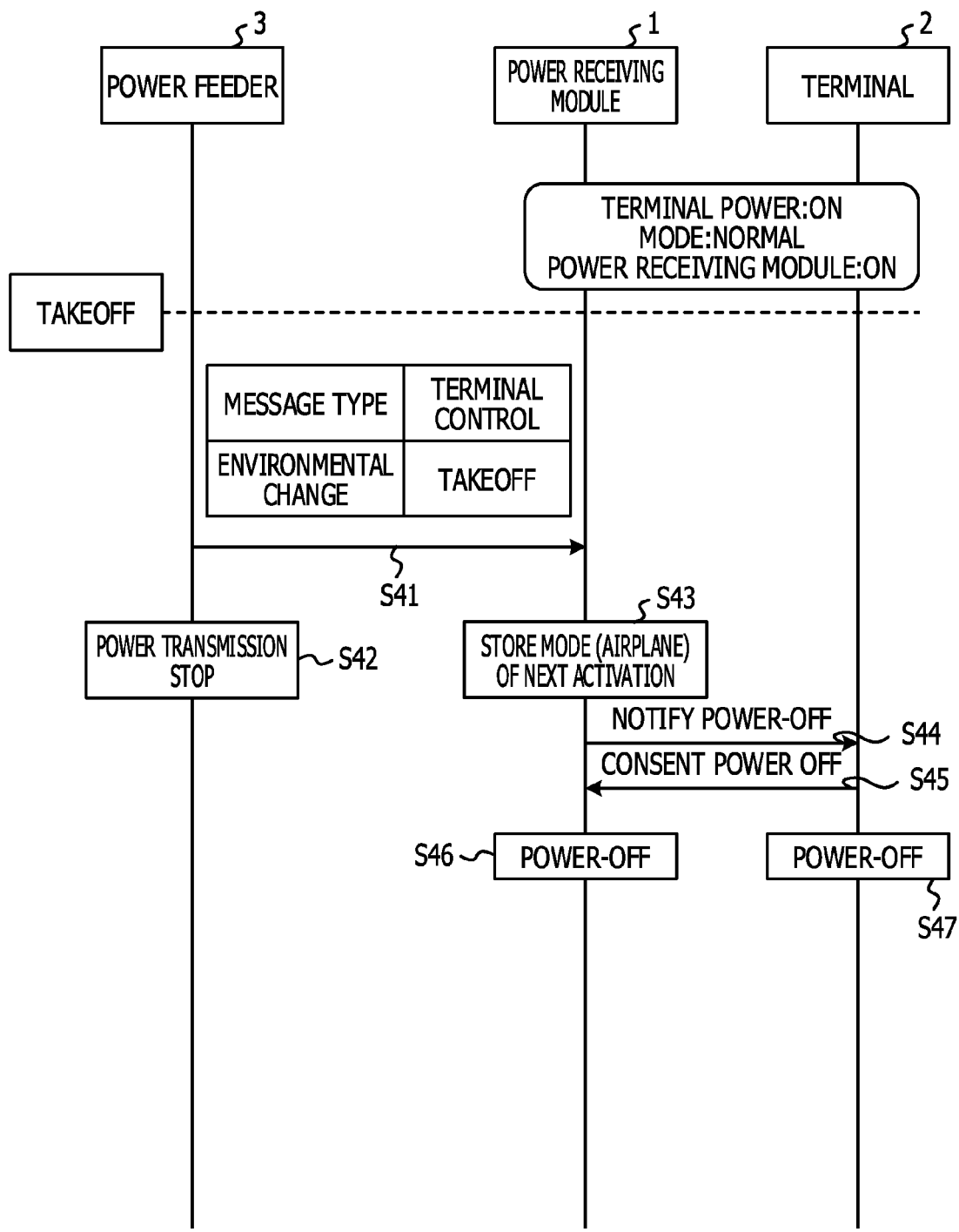
FIG. 12 is a diagram illustrating an example of a process sequence among the power receiving module, the portable terminal, and the power feeder, if the user is aboard the airplane, when the power receiving module and the portable terminal are both in the power-on state, according to the modification example of the first embodiment.

FIG. 12 is a diagram illustrating an example of a process sequence among the power receiving module 1, the portable terminal 2, and the power feeder 3, if the user is aboard the airplane, when the power receiving module 1 and the portable terminal 2 are both in the power-on state, according to a modification example of the first embodiment. Before boarding, the operation mode is the normal mode.

In S1, power is supplied from the power feeder 3 to the airplane, until the airplane is prepared for takeoff, and the power receiving module 1 receives a terminal control message from the power feeder 3 (in FIG. 11, OP41). In S1, in the terminal control message transmitted from the power feeder 3, "takeoff" is contained in the "environmental change information". In S42, the power feeder 3 stops the power transmission.

In S43, since the "environmental change information" in the terminal control message is "takeoff" (in FIG. 11, OP43: YES), the power receiving module 1 stores "airplane mode" in the operation mode storage unit 13 (in FIG. 11: OP44).

Since the portable terminal 2 is in a power-on state (in FIG. 7B, OP9: YES), in S44, the power receiving module 1 notifies the power-off to the portable terminal 2 (in FIG. 7B, OP10). In S45, the portable terminal 2 notifies the power receiving module of an acknowledgement for the power-off, with respect to the notification of the power-off from the power receiving module 1.

In S46, since the notification of the acknowledgement for the power-off is received from the portable terminal 2 (in FIG. 7B, OP11: YES), the power of the power receiving module 1 is turned off (in FIG. 7B, OP14). In S47, the power of the portable terminal 2 is turned off.

If the process up to S47 is completed, the powers of the portable terminal 2 and the power receiving module 1 both are turned off. In other words, in the modification example of the first embodiment, even if the user is aboard the airplane when the portable terminal 2 is in a power-on state, if the airplane is prepared for takeoff, the powers of the portable terminal 2 and the power receiving module 1 are automatically turned off.

After the process illustrated in FIG. 12, when the user turns on the power of the portable terminal 2 after the airplane enters the stable flight, the process sequence of the power receiving module control unit 1 and the portable terminal 2 is the same as, for example, the process sequence illustrated in FIG. 9B, and the portable terminal 2 is activated in the airplane mode. Thereafter, when the airplane is prepared for landing, the terminal control message in which the "environmental change information" is the "landing" is transmitted from the power feeder 3, and the power receiving module 1 stores the "normal mode" as the operation mode of the next activation in the operation mode storage unit 13, and notifies the power-off to the portable terminal 2 (in FIG. 11, OP45: YES, and OP46, and in FIG. 7B, OP10).

Further, when the portable terminal 2 is in a power-off state, and the power receiving module 1 is in a power-on state, even if the user is aboard the airplane, the terminal control message in which the "environmental change information" is the "landing" is received from the power feeder 3, and the power receiving module 1 stores the "airplane mode" as the operation mode of the next activation (in FIG. 11, OP43: YES, and OP44).

Accordingly, according to the modification example of the first embodiment, even if the environmental change information, instead of the power control and a setting of the operation mode, is contained in the terminal control message, it is possible to automatically set the power control and the operation mode of the portable terminal 2, depending on a situation.

Second Embodiment

In a second embodiment, a power supply control message is transmitted from the power feeder 3. A power supply control message is a message to notify the control state of the power supply of the power feeder 3 to the power receiving module 1. Meanwhile, if the power supply control message of power transmission stop is received from the power feeder 3, the power receiving module 1 acquires position information from the portable terminal 2, and determines the power control and the setting of the operation mode of the portable terminal 2, based on the position information. Hereinafter, in the second embodiment, a description overlapping the first embodiment is omitted.

In the second embodiment, the portable terminal 2 includes a GPS signal receiver as one hardware configuration. Except for the GPS signal receiver, the hardware configurations and the functional configurations of the power receiving module 1, the portable terminal 2, and the power feeder 3 in the second embodiment are the same as in the first embodiment. In the second embodiment, the position acquisition unit 25 of the portable terminal 2 and the terminal position storage unit 14 of the power receiving module 1 are activated.

In the second embodiment, the operation mode of the terminal setting program for a power receiving module is a program for receiving the notification of the power transmission stop from the power feeder 3, and determines the power control and the setting of the operation mode of the portable terminal 2, based on the position information of the portable terminal 2.

For example, the position acquisition unit 25 of the portable terminal 2 is a functional configuration to be implemented by the CPU 201 executing the operation mode of the terminal setting program for a terminal stored in the non-volatile memory 203. The position acquisition unit 25 acquires the position information at a predetermined interval. Examples of the position information include coordinate information of latitude and longitude using a GPS signal, and area information indicating a type of an area which is acquired from a transmitter such as an access point of a wireless LAN, and one or a plurality thereof are acquired.

In the second embodiment, the position acquisition unit 25 acquires area information and GPS coordinate information as position information. The interval at which the area information and the GPS coordinate information are acquired is, for example, one minute. The position acquisition unit 25 transmits the acquisition time of each of the area information and the coordinate information which are acquired to the power receiving module 1, at a predetermined interval, according to an inquiry from the power receiving module 1. The interval at which the position information is transmitted to the power receiving module 1 is, for example, one minute.

When the position information is acquired from the position acquisition unit 25 of the portable terminal 2, through the communication unit 15 for a terminal, the power receiving module control unit 11 of the power receiving module 1 stores the position information in the terminal position storage unit 14. Since the position information is received from the portable terminal 2 at a predetermined interval and is stored in the terminal position storage unit 14, even if the power of the portable terminal 2 is turned off, the power receiving module 1 can store the position information which is last acquired before the power of the portable terminal 2 is turned off.

When the power supply control message containing the power supply stop is acquired from the power feeder 3, the power receiving module control unit 11 performs the power control and the setting of the operation mode of the portable terminal 2, based on the position information of the portable terminal 2. When the power supply control message containing the power supply stop is acquired, if the position information (area information) of the portable terminal 2 indicates, for example, an apron, the power receiving module control unit 11 determines the power-off of the portable terminal 2 and the operation mode of the next activation as the "airplane mode". When the position of the portable terminal 2 at the time of the stop of the power transmission of the power feeder 3 is an apron, the reason of the power supply stop is estimated that the airplane in which the user is aboard is prepared for takeoff.

When the portable terminal 2 is in a power-on state and GPS coordinate information is input at a predetermined interval, the power receiving module control unit 11 calculates a moving speed from the coordinate information. The moving speed is calculated, for example, every time when the GPS coordinate information is input from the portable terminal 2. In addition, the moving speed may be calculated by the terminal control unit 21 of the portable terminal 2, and notified to the power receiving module 1.

Further, when the power supply control message containing the power supply stop is acquired, if the GPS coordinate information is input from the portable terminal 2, and the moving speed is earlier than a predetermined threshold, the power receiving module control unit 11 determines the power-off of the portable terminal 2, and the operation mode of the next activation as the "normal mode". When the moving speed of the portable terminal 2 is earlier than a predetermined threshold at the time of the stop of the power transmission of the power feeder 3, it is estimated that the airplane is cruising and the reason of the power supply stop is because the airplane in which the user is aboard is prepared for landing.

In the second embodiment, the operation mode of the terminal setting program for power feeder is a program for transmitting a control signal addressed to the power receiving module 1 used in wireless power supply by including the notification of the power supply termination in the control signal. When the power transmission of the power feeder 3 is stopped by for example, the operation of the crew and the input from an operating system in the airplane, the power supply control determination unit 31 makes and transmits a power supply control message containing the notification of power supply termination.

FIG. 13 is an example of data stored in the terminal position storage unit 14 of the power receiving module 1. The terminal position storage unit 14 is formed in a storage area of the non-volatile memory 104. The terminal position storage unit 14 stores the position information which is input from the portable terminal 2 at a predetermined interval, and the acquisition time of the position information. FIG. 13 illustrates an example in which area information is stored as the position information. If area information is newly input from the portable terminal 2, the area information stored in the terminal position storage unit 14 is overwritten.

Further, in the second embodiment, since the GPS coordinate information as the position information is also input from the portable terminal 2, the terminal position storage unit 14 stores the GPS coordinate information, and the acquisition time of the coordinate information. In addition, a predetermined number of pieces of GPS coordinate information are stored in the terminal position storage unit 14. When coordinate information is newly input from the portable terminal 2, in the terminal position storage unit 14, the oldest coordinate information is deleted and new coordinate information is additionally added by the power receiving module control unit 14. The terminal position storage unit 14 is an example of the "storage unit".

FIG. 14 is a diagram illustrating an example of information contained in the power supply control message. In the power supply control message, there are items of a "message type", and a "power supply control". In the case of the power supply control message, "power supply control" is stored in the "message type", and thus it is determined that the control message is the power supply control message. The power supply control message is an example of "a predetermined control signal".

"power supply termination" or "power supply start" is stored in the power supply control in the power supply control message. When the power transmission of the power feeder 3 is stopped by for example, the operation of the crew and the input from an operating system in the airplane, the power supply control determination unit 31 of the power feeder 3 stores the "power supply termination" in the "power supply control" so as to make a power supply control message. Further, when the power transmission of the power feeder 3 is started by for example, the operation of the crew and the input from an operating system in the airplane, the power supply control determination unit 31 of the power feeder 3 stores the "power supply start" in the "power supply control" so as to make a power supply control message.

In addition, in FIG. 14, although an item of "reason" is contained in the power supply control message, the item is not used in the second embodiment. The item of "reason" in the power supply control message will be described in a modification example of the second embodiment described below.

Figure 15A:
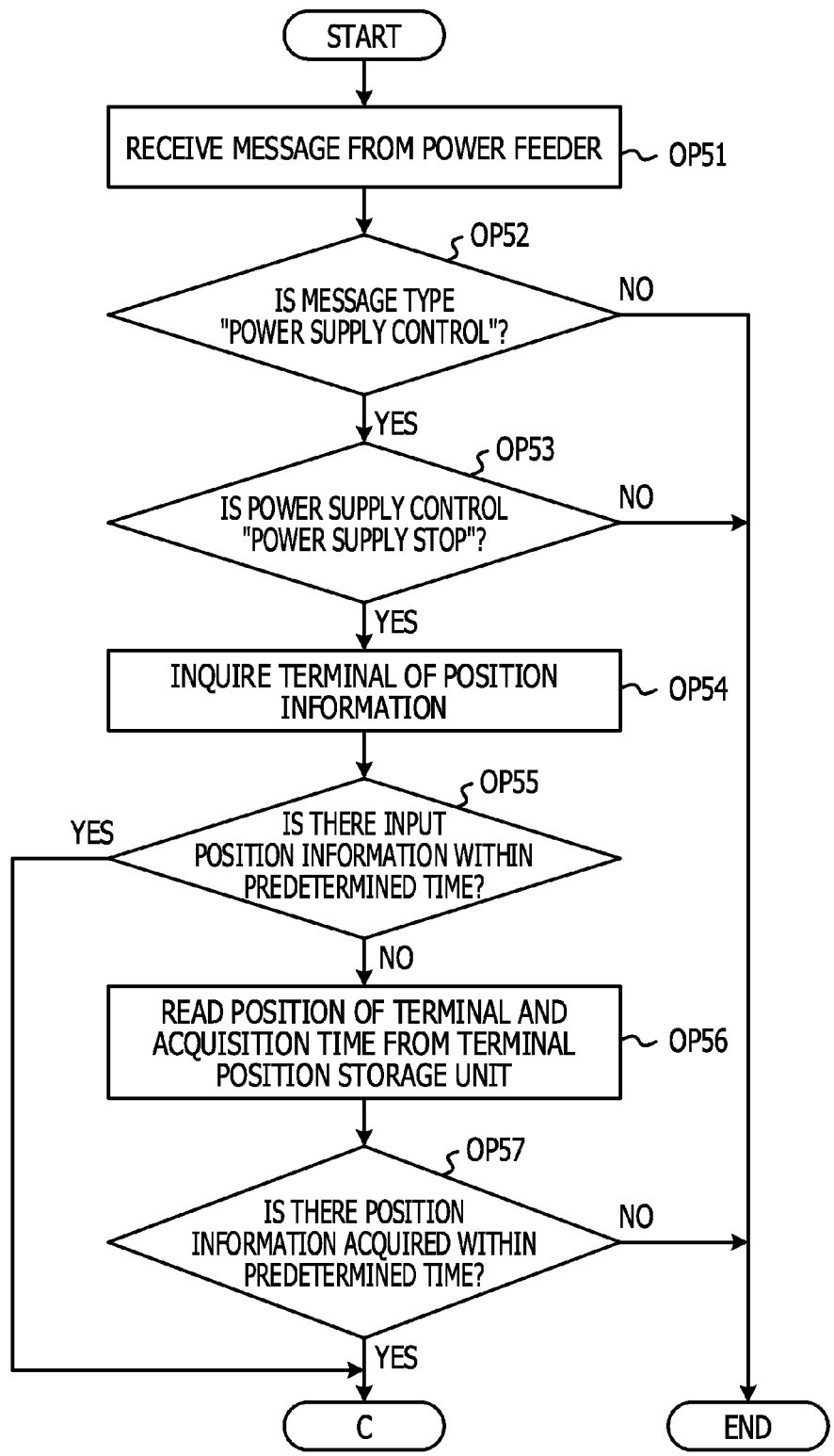
FIG. 15A is an example of a flowchart of a process of a power receiving module control unit of the power receiving module, according to a second embodiment.
Figure 15B:
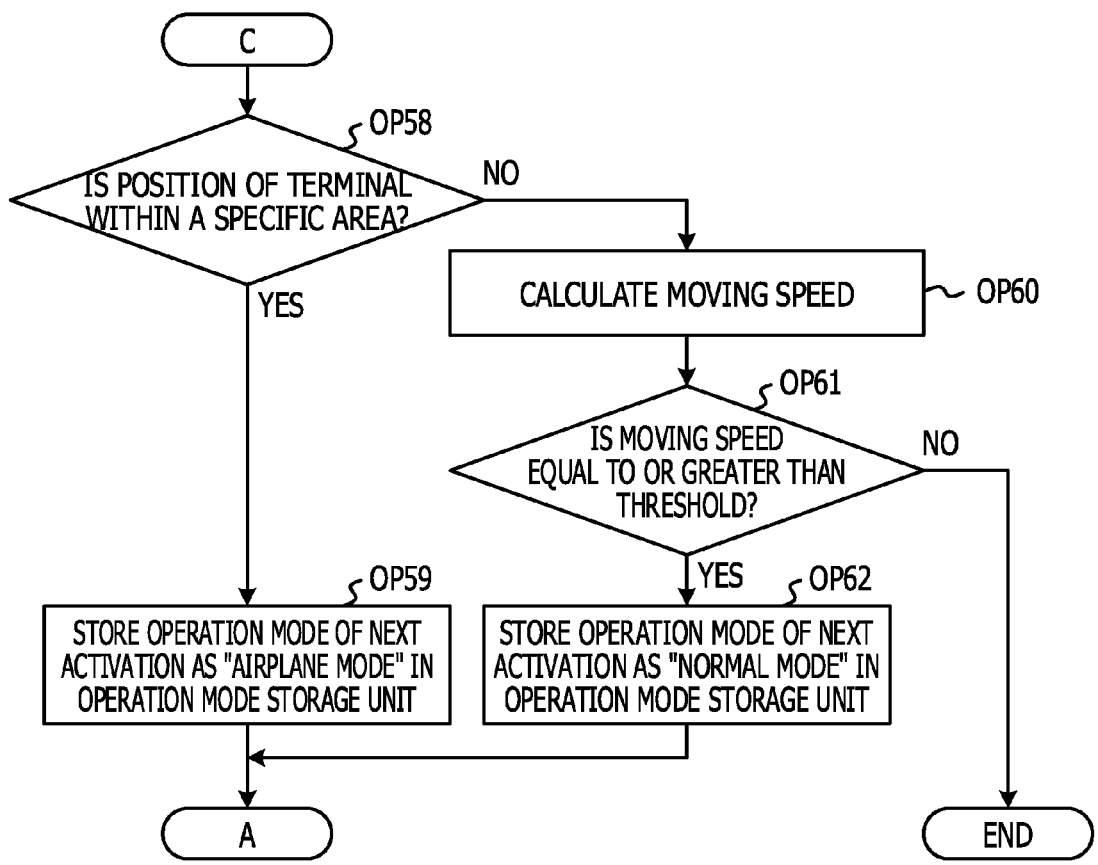
FIG. 15B is an example of a flowchart of a process of the power receiving module control unit of the power receiving module, according to the second embodiment.

FIGS. 15A and 15B are an example of a flowchart of a process of the power receiving module control unit 11 of the power receiving module 1, according to the second embodiment. The process illustrated in FIGS. 15A and 15B is started if the control message is input from the communication unit 12 for a power feeder of the power receiving module 1 to the power receiving module control unit 11.

In OP51, the power receiving module control unit 11 receives the control message from the power feeder 3, through the communication unit 12 for a power feeder. Next, the process proceeds to OP52.

In OP52, the power receiving module control unit 11 determines whether or not the "message type" in the control message is "power supply control". When the "message type" in the control message is not "power supply control" (OP52: NO), the process illustrated in FIG. 15A is completed. When the "message type" in the control message is "power supply control" (OP52: YES), the process proceeds to OP53.

In OP53, the power receiving module control unit 11 determines whether or not the "power supply control" in the power supply control message is "power supply stop". When the "power supply control" in the power supply control message is not "power supply stop" (OP53: NO), the process illustrated in FIG. 15A is completed. When the "power supply control" in the power supply control message is "power supply stop" (OP53: YES), the process proceeds to OP54.

In OP54, the power receiving module control unit 11 inquires the portable terminal 2 of the current position information. Next, the process proceeds to OP55.

In OP55, the power receiving module determines whether or not position information is input from the portable terminal 2 within a predetermined time. The predetermined time is, for example, three seconds. When the position information is input from the portable terminal 2 within a predetermined time (OP55: YES), the process proceeds to OP58. When position information is not input from the portable terminal 2 within a predetermined time (OP55: NO), the process proceeds to OP56. In addition, in FIGS. 15A and 15B, the position information contains the area information and the GPS coordinate information. When the portable terminal 2 is in a power-on state, at least position information of the GPS is input from the portable terminal 2, and thus the process proceeds to OP58.

In OP56, the power receiving module control unit 11 reads the position information and the acquisition time from the terminal position storage unit 14. Next, the process proceeds to OP57.

In OP57, the power receiving module control unit 11 determines whether or not the position information acquired within a predetermined time. The predetermined time is, for example, a time up to 10 minutes before the current time. When there is the position information acquired within a predetermined time (OP57: YES), the process proceeds to OP58. When there is not the position information acquired within a predetermined time (OP57: NO), the process illustrated in FIG. 15A is completed.

In OP58, the power receiving module control unit 11 determines whether or not the position of the portable terminal 2 is within a specific area. The specific area is defined in advance by the area information or the GPS coordinate information, and is stored in for example, the non-volatile memory 104. In the case of the second embodiment, the specific area is, for example, an apron. When the position of the portable terminal 2 is within the specific area (OP58: YES), the process proceeds to OP59.

In OP59, the power receiving module control unit 11 stores the "airplane mode" in the operation mode storage unit 13, as the operation mode of the next activation of the portable terminal 2. Next, the process proceeds to OP9 in FIG. 7B, the powers of the portable terminal 2 and the power receiving module 1 are turned off, and the processes illustrated in FIGS. 15B and 7B are completed.

In OP58, when the position of the portable terminal 2 is not within the specific area (OP58: NO), the process proceeds to OP60. In OP60, the power receiving module control unit 11 calculates a moving speed, from the GPS coordinate information which is input from the portable terminal 2 at a predetermined interval. Next, the process proceeds to OP61.

In OP61, the power receiving module control unit 11 determines whether or not the moving speed of the portable terminal 2 is equal to or greater than a predetermined threshold. The predetermined threshold is, for example, a minimum speed while the airplane is cruising, in the second embodiment. When the moving speed of the portable terminal 2 is less than a predetermined threshold (OP61: NO), the process illustrated in FIG. 15B is completed. When the moving speed of the portable terminal 2 is equal to or greater than a predetermined threshold (OP61: YES), the process proceeds to OP62.

In OP62, the power receiving module control unit 11 stores the "normal mode" in the operation mode storage unit 13, as the operation mode of the next activation of the portable terminal 2. Next, the process proceeds to OP9 in FIG. 7B, the powers of the portable terminal 2 and the power receiving module 1 are turned off, and the processes illustrated in FIGS. 15B and 7B are completed.

Figure 16A:
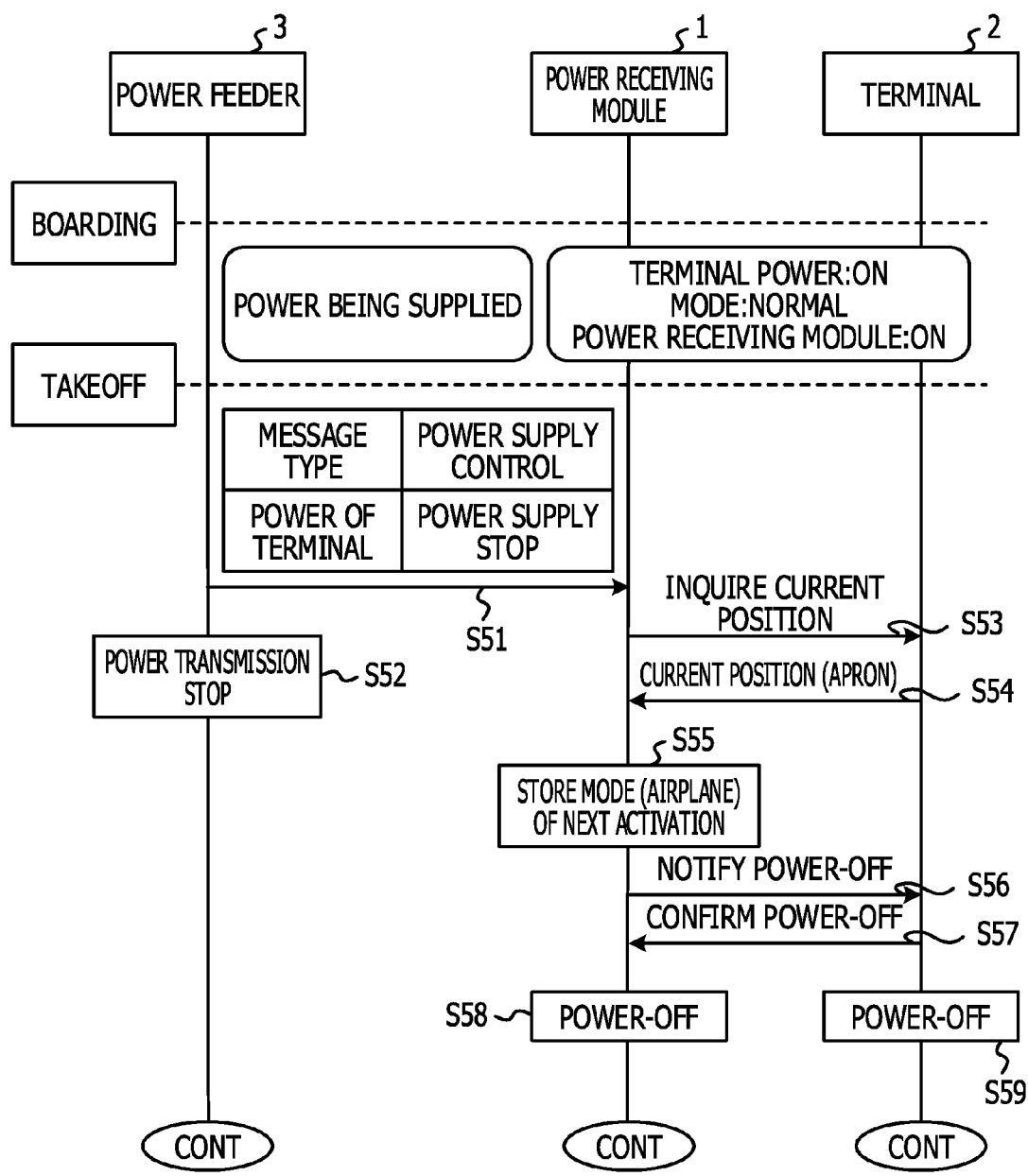
FIG. 16A is a diagram illustrating an example of a process sequence among the power receiving module, the portable terminal, and the power feeder, if a user is aboard the airplane, when the power receiving module and the portable terminal are both in the power-on state, according to the second embodiment.

FIG. 16A is a diagram illustrating an example of a process sequence among the power receiving module 1, the portable terminal 2, and the power feeder 3, if the user is aboard the airplane, when the power receiving module 1 and the portable terminal 2 are both in the power-on state, according to a second embodiment. Before boarding, the operation mode of the portable terminal 2 is the normal mode.

In S51, if the airplane is prepared for takeoff, the power feeder 3 transmits a power supply control message containing the "power supply stop", and the power receiving module 1 receives the power supply control message (in FIG. 15A, OP51). In S52, the power feeder 3 stops the power transmission.

In S53, since the power supply control message of the "power supply stop" is received (in FIG. 15A, OP52: YES, OP53: YES), the power receiving module 1 inquires the portable terminal 2 of the position information (in FIG. 15A, OP54). In S54, the portable terminal 2 acquires area information "apron" as the position information, with respect to the inquiry of the position information from the power receiving module 1, and notifies the power receiving module 1 of the area information "apron". In addition, in S54, since the airplane is in the apron and is not flying, the portable terminal 2 is able to acquire the area information "apron" from a transmitter on the ground.

In S55, since the area information "apron" corresponds to the specific area (in FIG. 15B, OP58: YES), the power receiving module 1 stores the "airplane mode" in the operation mode storage unit 13, as the operation mode of the next activation of the portable terminal 2 (in FIG. 15B, OP59).

In S56, the power receiving module 1 notifies the power-off to the portable terminal 2 (in FIG. 7B, OP10). In S57, the portable terminal 2 notifies the power receiving module of an acknowledgement for the power-off, with respect to the notification of the power-off from the power receiving module 1.

In S58, since the notification of the acknowledgement for the power-off is received from the portable terminal 2 (in FIG. 7B, OP11: YES), the power of the power receiving module 1 is turned off (in FIG. 7B, OP14). In S59, the power of the portable terminal 2 is turned off.

If the process up to S59 is completed, the powers of the portable terminal 2 and the power receiving module 1 both are turned off. In other words, even if the user is aboard the airplane while the portable terminal 2 is in a power-on state, if the airplane is prepared for takeoff and receives the power supply control message, the power receiving module 1 acquires the position information, and automatically determines the power-off of the portable terminal 2 and the power receiving module 1 from the position information. Further, the operation mode of the next activation of the portable terminal 2 is automatically determined as "airplane mode".

Figure 16B:
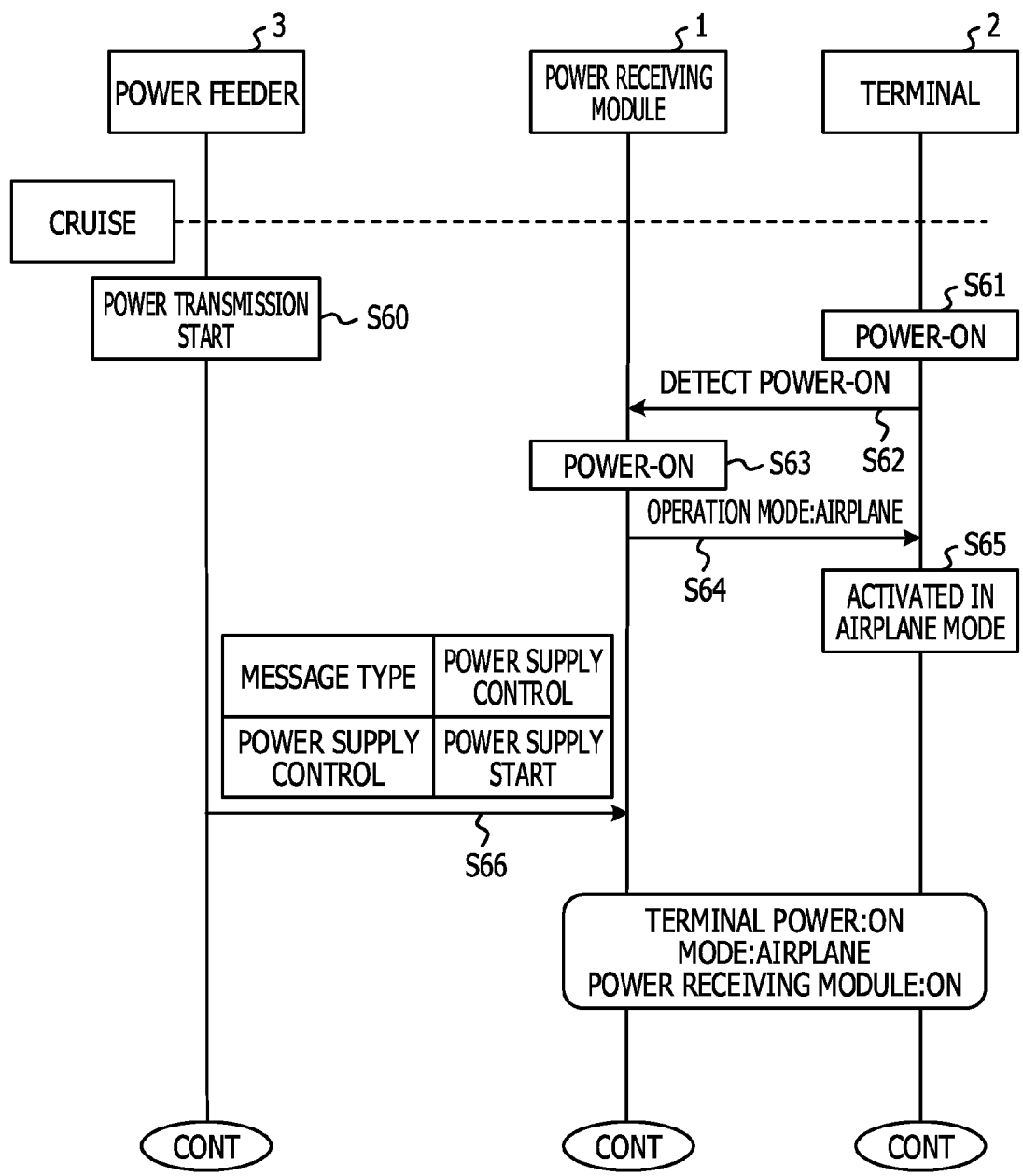
FIG. 16B is a diagram illustrating an example of a process sequence when the user turns on the power of the portable terminal, after the airplane enters a stable flight state.

FIG. 16B is a continuation of the process illustrated in FIG. 16A, and is a diagram illustrating an example of a process sequence when the user turns on the power of the portable terminal 2, after the airplane enters a stable flight state.

In S60, the airplane enters the stable flight, for example, the power transmission of the power feeder 3 is started by a predetermined operation of the crew.

In S61, the power of the portable terminal 2 is turned on the by the user. In S62, the portable terminal 2 notifies the power receiving module 1 of the power-on (in FIG. 8, OP31). In S63, the power receiving module 1 is activated by receiving the notification of the power-on from the portable terminal 2.

Since the operation mode storage unit 13 stores the "airplane mode" (in FIG. 7C, OP19: YES), in S64, the power receiving module 1 notifies the portable terminal 2 of the "airplane mode" (in FIG. 7C, OP20).

Since the portable terminal 2 receives the notification of the "airplane mode" from the power receiving module 1 (in FIG. 8, OP32: YES, and OP34: YES), in S65, the portable terminal 2 is activated in the "airplane mode" (in FIG. 8, OP35). In S66, the power feeder 3 transmits a power supply control message of "power supply start".

Figure 16C:
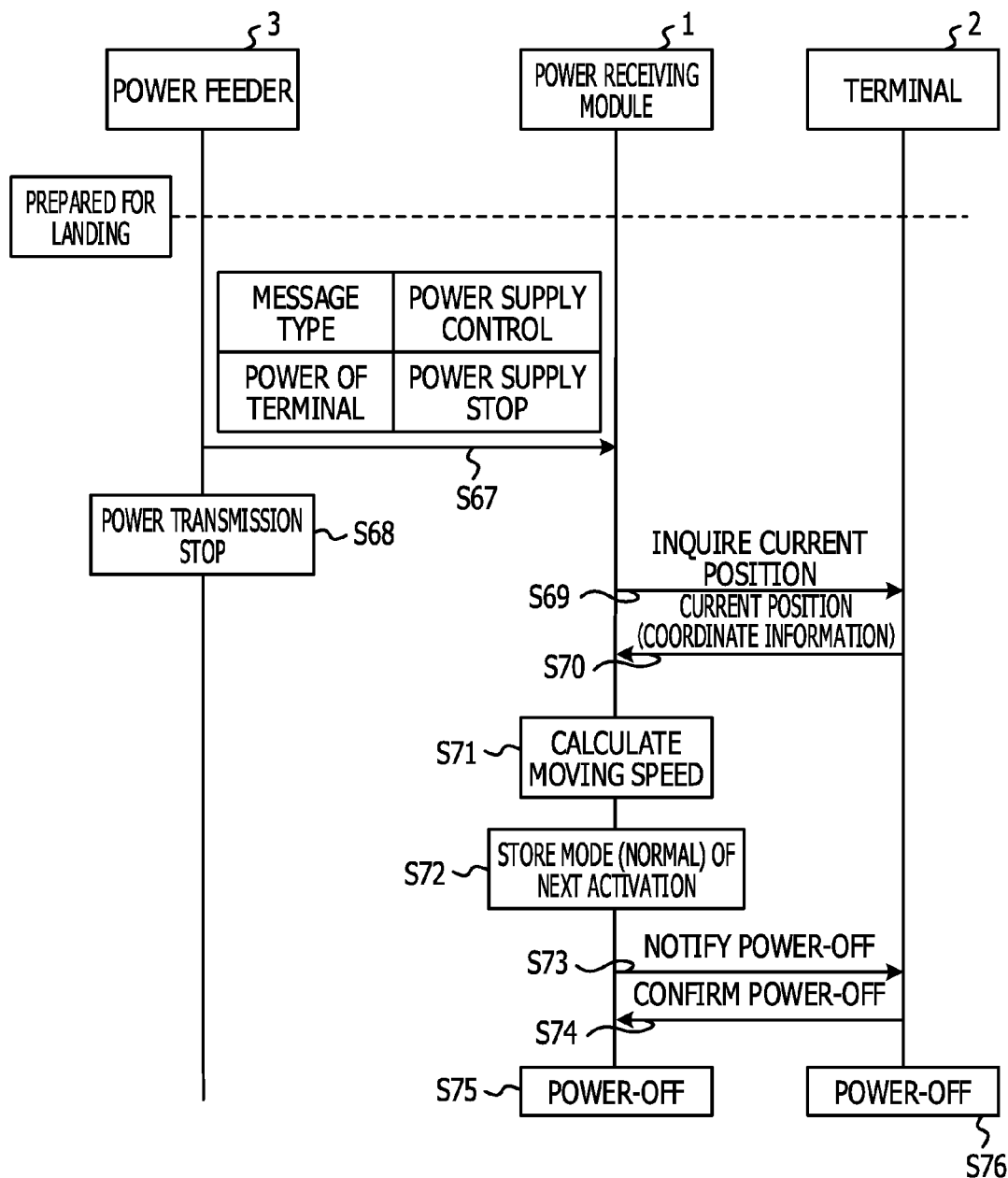
FIG. 16C is a diagram illustrating an example of a process sequence when the airplane is prepared for landing.

FIG. 16C is a continuation of the process illustrated in FIG. 16B, and is a diagram illustrating an example of a process sequence when the airplane is prepared for landing.

In S67, if the airplane is prepared for landing, the power feeder 3 transmits the power supply control message of the "power supply stop", and the power receiving module 1 receives the power supply control message (in FIG. 15A, OP51). In S68, the power feeder 3 stops the power transmission.

In S69, since the power supply control message of the "power supply stop" is received (in FIG. 15A, OP52: YES, and OP53: YES), the power receiving module 1 inquires the portable terminal 2 of the position information (in FIG. 15A, OP54). In S70, since the airplane is flying, the portable terminal 2 is not able to acquire area information from a transmitter on the ground, and notifies the power receiving module 1 of the GPS coordinate information as the position information. In addition, it is possible to receive the GPS signal without the portable terminal 2 transmitting radio waves, in other words, even in the airplane mode.

In S71, since the airplane is flying and it is not possible to determine whether or not the current position is within the specific area from the GPS coordinate information (in FIG. 15B, OP58: NO), the power receiving module 1 calculates a moving speed from the coordinate information (in FIG. 15B, OP60).

In S72, since the airplane is flying, the moving speed is faster than the predetermined threshold (in FIG. 15B, OP61: YES), such that the power receiving module 1 stores the "normal mode" in the operation mode storage unit 13 (in FIG. 15B, OP62).

In S73, the power receiving module 1 notifies the power-off to the portable terminal 2 (in FIG. 7B, OP10). In S74, the portable terminal 2 notifies the power receiving module of an acknowledgement for the power-off, with respect to the notification of the power-off from the power receiving module 1.

Since the notification of the power-off is received from the portable terminal 2 (in FIG. 7B, OP11: YES), in S75, the power of the power receiving module 1 is turned OFF (in FIG. 7B, OP14). In S76, the power of the portable terminal 2 is turned off.

If the process of S76 is completed, the powers of the portable terminal 2 and the power receiving module 1 both are turned off. In other words, while the airplane is cruising, if the user turns on the power of the portable terminal 2, the airplane is prepared for landing, and the power supply control message of power supply stop is received, the power receiving module 1 calculates a moving speed, and determines the power-off of the portable terminal 2, and the power receiving module 1 and the operation mode of the next activation as the "normal mode".

FIG. 17 is a diagram illustrating an example of a process sequence among the power receiving module 1, the portable terminal 2, and the power feeder 3, when the portable terminal 2 is in a power-off state, the power receiving module 1 is in a power-on state, and the user is aboard the airplane. Even if the power of the portable terminal 2 is turned off by the user, the power receiving module 1 maintains the power-on state. Before boarding, the operation mode of the portable terminal 2 is the normal mode.

In S81, the airplane is prepared for takeoff, and the power receiving module 1 receives the power supply control message containing "power supply stop" from the power feeder 3 (in FIG. 15A, OP51). In S82, the power feeder 3 stops the power transmission.

In S83, since the power supply control message of "power supply stop" is received (in FIG. 15A, OP52: YES, and OP53: YES), the portable terminal 2 is in a power-off state, and the current position information is not obtained (in FIG. 15A, OP55: NO), the power receiving module 1 reads the position information and the acquisition time from the terminal position storage unit 14 (in FIG. 15A, OP56). It is assumed that the terminal position storage unit 14 stores the area information "apron" and an acquisition time within a predetermined time from the current time.

In S84, since the area information "apron" of the specific area acquired within a predetermined time from the current time is acquired from the terminal position storage unit 14 (in FIG. 15A, OP57: YES, and in FIG. 15B, OP58: YES), the power receiving module 1 stores "airplane mode" in the operation mode storage unit 13, as the operation mode of the next activation of the portable terminal 2 (in FIG. 15B, OP59).

In S85, since the portable terminal 2 is in a power-off state (in FIG. 7B, OP9: NO), the power receiving module 1 turns off the power of the power receiving module 1 (in FIG. 7B, OP14).

If the process of S85 is completed, the powers of the portable terminal 2 and the power receiving module 1 both are turned off. Thereafter, when the airplane enters the stable flight and the user turns on the power of the portable terminal 2, since "airplane mode" is stored in the operation mode storage unit 13 of the power receiving module 1, similar to FIG. 16B, the portable terminal 2 is activated in the airplane mode. In other words, when the portable terminal 2 is in a power-off state, the power receiving module 1 is in a power-on state, and the operation mode is the normal mode, even if the user is aboard the airplane, if the airplane is prepared for takeoff, the operation mode is changed to the airplane mode. Further, while the airplane is cruising, if the power of the portable terminal 2 is turned on by the user, the portable terminal 2 is activated in the airplane mode.

Operation and Effect of Second Embodiment

In the second embodiment, the power supply stop is notified from the power feeder 3 to the power receiving module 1, and the power receiving module 1 determines the power-on or off and the operation mode of the portable terminal 2, from the position information, by using the control signal used in the wireless power supply scheme. Accordingly, it is possible to automatically change the power state and the operation mode of the portable terminal 2, depending on the situation.

Further, in the second embodiment, the power receiving module 1 acquires the position information from the portable terminal 2 at a predetermined interval, and stores the position information in the terminal position storage unit 14. Thus, even when the portable terminal 2 is in a power-off state, the power receiving module 1 can acquire the position information, and when the position information is acquired within a predetermined time, it is possible to set the operation mode of the portable terminal 2 even when the portable terminal 2 is in a power-off state.

Modification Example of Second Embodiment

In a modification example of the second embodiment, an item of "reason" is added to the power supply control message from the power feeder 3, and the power supply stop and the reason are notified from the power feeder 3 to the power receiving module 1. The power receiving module 1 performs the power control and the setting of the operation mode of the portable terminal 2, based on the notified reason, without acquiring the position information.

In the present modification example, the hardware and functional configurations of the power receiving module 1, the portable terminal 2, and the power feeder 3 are the same as in the second embodiment. In the present modification example, the item of "reason" is added in the power supply control message, in addition to the item of "power control". Information indicating why the power supply is stopped is set in the item of "reason".

In the modification example of the second embodiment, the reason why the power supply of the power feeder 3 is stopped is because the airplane is prepared for takeoff or landing. Accordingly, in the modification example of the second embodiment, either "specific area 1" indicating a presence area of the airplane during the takeoff, or "specific area 2" indicating a presence area of the airplane during the landing is set in the item of "reason". In addition, information contained in the item of "reason" in the power supply control message may be set, depending on the location or facility to which the wireless power supply system 100 is applied.

When the "reason" in the received power supply control message is "specific area 1", the power receiving module control unit 11 of the power receiving module 1 determines the power-off of the portable terminal 2, and the operation mode of the next activation of the portable terminal 2 as "airplane mode". Further, when the "reason" in the received power supply control message is "specific area 2", the power receiving module control unit 11 determines that the portable terminal 2 is in a power-off state and the operation mode of the next activation of the portable terminal 2 is "normal mode".

Figure 18:
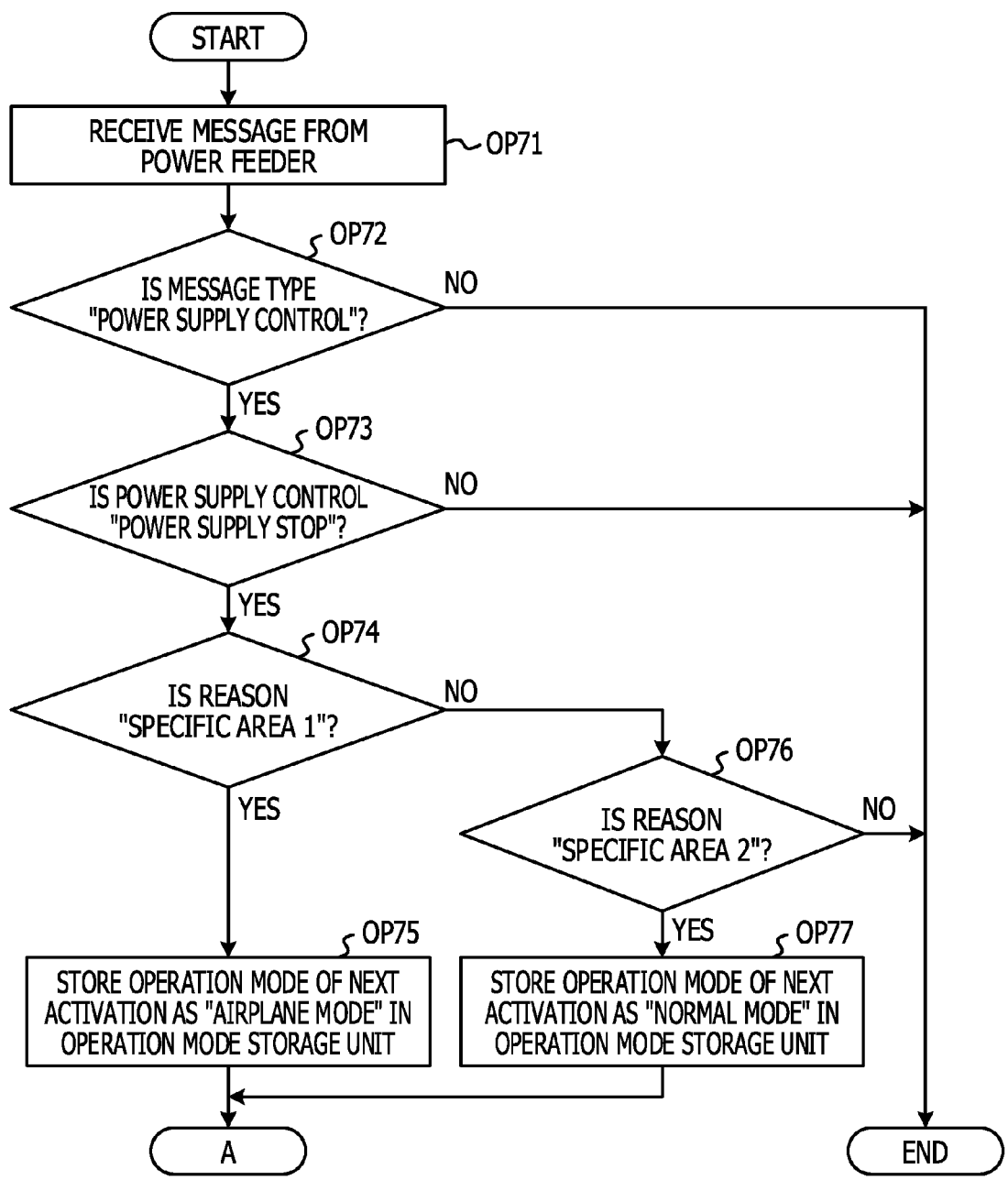
FIG. 18 is an example of a flowchart of a process of the power receiving module control unit, according to a modification example of the second embodiment.

FIG. 18 is an example of a flowchart of a process of the power receiving module control unit 11, according to a modification example of the second embodiment. The process illustrated in FIG. 18 is started if a control message is input from the communication unit 12 for a power feeder of the power receiving module 1 to the power receiving module control unit 18.

In OP71, the power receiving module control unit 11 receives the control message from the power feeder 3, through the communication unit 12 for a power feeder. Next, the process proceeds to OP72.

In OP72, the power receiving module control unit 11 determines whether or not the "message type" in the control message is "power supply control". When the "message type" in the control message is not "power supply control" (OP72: NO), the process illustrated in FIG. 18 is completed. When the "message type" in the control message is "power supply control" (OP72: YES), the process proceeds to OP73.

In OP73, the power receiving module control unit 11 determines whether or not the "power supply control" in the power supply control message is "power supply stop". When the "power supply control" in the power supply control message is not "power supply stop" (OP73: NO), the process illustrated in FIG. 18 is completed. When the "power supply control" in the power supply control message is "power supply stop" (OP73: YES), the process proceeds to OP74.

In OP74, the power receiving module control unit 11 determines whether or not the "reason" in the power supply control message is "specific area 1".

When the "reason" in the power supply control message is "specific area 1" (OP74: YES), the process proceeds to OP75.

In OP75, the power receiving module control unit 11 stores the "airplane mode" in the operation mode storage unit 13, as the operation mode of the next activation of the portable terminal 2. Next, the process proceeds to OP9 in FIG. 7B, the powers of the portable terminal 2 and the power receiving module 1 are turned off, and the processes illustrated in FIGS. 18 and 7B are completed.

In OP74, when the "reason" in the power supply control message is not "specific area 1" (OP74: NO), the process proceeds to OP76. In OP76, the power receiving module control unit 11 determines whether or not the "reason" in the power supply control message is "specific area 2". When the "reason" in the power supply control message is not "specific area 2" (OP76: NO), the process illustrated in FIG. 18 is completed. When the "reason" in the power supply control message is "specific area 2" (OP76: YES), the process proceeds to OP77.

In OP77, the power receiving module control unit 11 stores the "normal mode" in the operation mode storage unit 13, as the operation mode of the next activation of the portable terminal 2. Next, the process proceeds to OP9 in FIG. 7B, the powers of the portable terminal 2 and the power receiving module 1 are turned off, and the processes illustrated in FIGS. 18 and 7B are completed.

Figure 19:
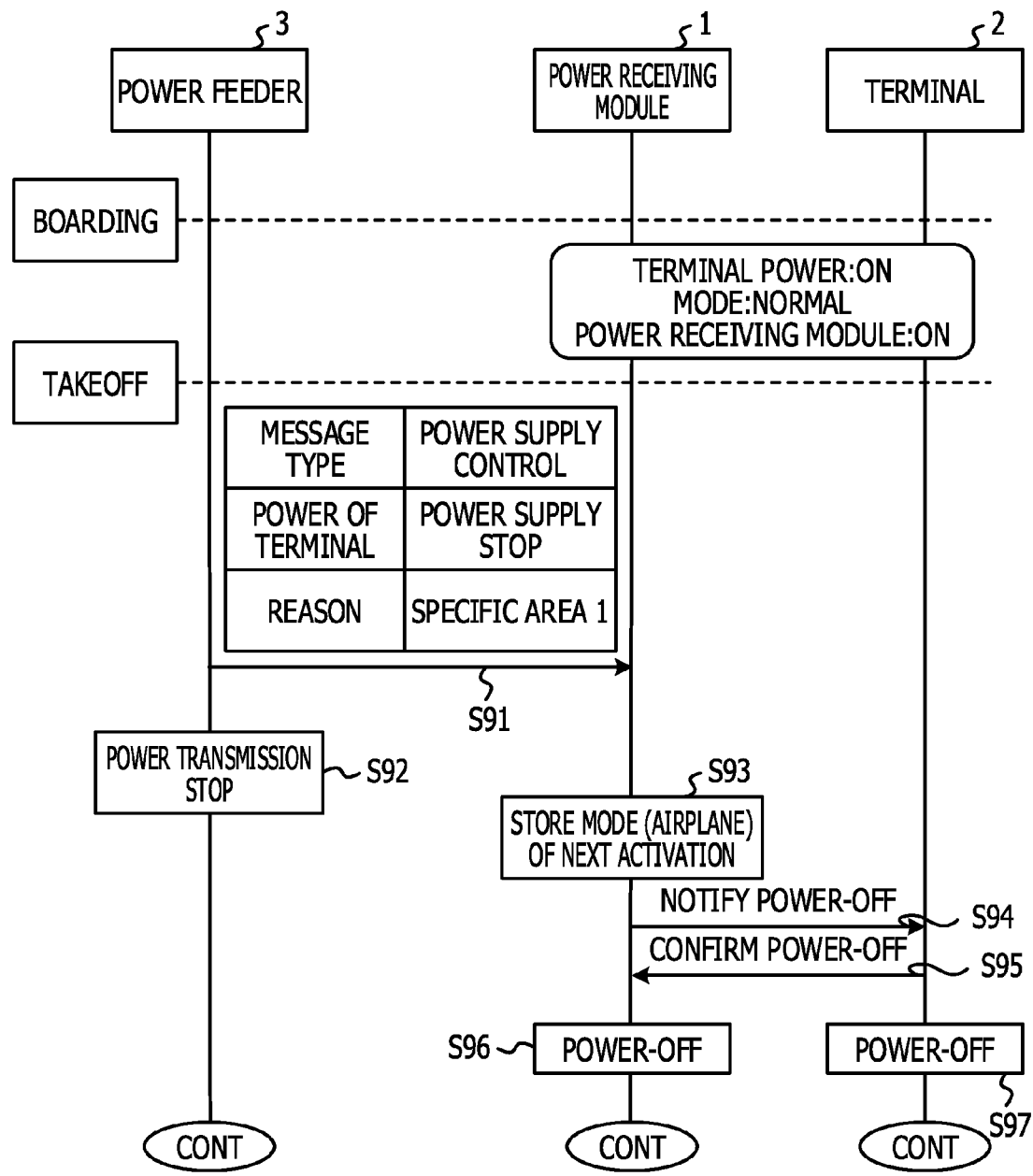
FIG. 19 is a diagram illustrating an example of a process sequence among the power receiving module, the portable terminal, and the power feeder, if the user is aboard the airplane, when the power receiving module and the portable terminal are both in the power-on state, according to the modification example of the second embodiment.

FIG. 19 is a diagram illustrating an example of a process sequence among the power receiving module 1, the portable terminal 2, and the power feeder 3, if the user is aboard the airplane, when the power receiving module 1 and the portable terminal 2 are both in the power-on state, according to a modification example of the second embodiment. Before boarding, the operation mode of the portable terminal 2 is the normal mode.

In S91, the airplane is prepared for takeoff, and the power receiving module 1 receives the power supply control message from the power feeder 3 (in FIG. 18, OP71). In S91, in the power supply control message received by the power receiving module 1, the "power supply stop" is contained in the "power supply control", and the "specific area 1" is contained in the "reason". In S92, the power feeder 3 stops the power transmission.

In S93, since the power supply control message of "power supply stop" is received (in FIG. 18, OP72: YES, and OP73: YES) and the "reason" is the "specific area 1" (in FIG. 18, OP74: YES), the power receiving module 1 stores the airplane mode in the operation mode storage unit 13 (in FIG. 18: OP75).

Since the portable terminal 2 is in a power-on state (in FIG. 7B, OP9: YES), in S94, the power receiving module 1 notifies the power-off to the portable terminal 2 (in FIG. 7B, OP10). In S95, the portable terminal 2 notifies the power receiving module of an acknowledgement for the power-off, with respect to the notification of the power-off from the power receiving module 1.

In S96, since the notification of the acknowledgement for the power-off is received from the portable terminal 2 (in FIG. 7B, OP11: YES), the power of the power receiving module 1 is turned off (in FIG. 7B, OP14). In S97, the power of the portable terminal 2 is turned off.

If the process up to S97 is completed, the powers of the portable terminal 2 and the power receiving module 1 both are turned off. In other words, in the modification example of the second embodiment, even if the user is aboard the airplane when the portable terminal 2 is in a power-on state, if the airplane is prepared for takeoff, the powers of the portable terminal 2 and the power receiving module 1 are automatically turned off.

After the process illustrated in FIG. 19, when the user turns on the power of the portable terminal 2 after the airplane enters the stable flight, the process sequences of the power receiving module control unit 1 and the portable terminal 2 are the same as, for example, the process sequence illustrated in FIG. 16B, and the portable terminal 2 is activated in the airplane mode. Thereafter, when the airplane is prepared for landing, the power supply control message containing the "power supply stop" in which the "reason" is the "specific area 2" is transmitted from the power feeder 3, and if the power supply control message is received, the power receiving module 1 stores the "normal mode" as the operation mode of the next activation in the operation mode storage unit 13, and notifies the power-off to the portable terminal 2 (in FIG. 18, OP76: YES, and OP77, and in FIG. 7B, OP10).

Further, when the portable terminal 2 is in a power-off state, and the power receiving module 1 is in a power-on state, even if the user is aboard the airplane, the power supply control message in which the "reason" is the "specific area 1" is received from the power feeder 3, and the power receiving module 1 stores the "airplane mode" as the operation mode of the next activation (in FIG. 18, OP74: YES, and OP75).

Accordingly, according to the modification example of the second embodiment, when the reason of the power supply stop is contained in the power supply control message, even if the power receiving module 1 acquires position information, it is possible to automatically set the power control and the operation mode of the portable terminal 2, depending on a situation, based on the reason power supply stop.

In addition, the "reason" in the power supply control message is not the position information such as "specific area 1", but may be information indicating an environmental change such as "takeoff" and "landing".

Third Embodiment

Since the control signal from the power feeder 3 is used in the first and second embodiments, when the wireless power supply system 100 is introduced, the configuration of the power feeder 3 is changed. Thus, in a third embodiment, the power receiving module 1 performs terminal power control depending on a situation, without using the control signal from the power feeder 3. Further, in the third embodiment, the power receiving module 1 acquires the position information, and determines the operation mode of the power of the portable terminal 2, based on the position information. Hereinafter, in third embodiment, a description overlapping the first and second embodiment is will be omitted.

In the third embodiment, the hardware and functional configurations of the power receiving module 1, the portable terminal 2, and the power feeder 3 are the same as in the second embodiment. In the second embodiment, the operation mode of the terminal setting program for a power receiving module is a program for detecting the power transmission stop from the power feeder 3, and determining the power control and the setting of the operation mode of the portable terminal 2, based on the position information of the portable terminal 2.

In the third embodiment, the power receiving control unit 16 detects the power supply stop from the power feeder 3, and notifies the power supply stop to the power receiving module control unit 11. For example, if the voltage of the power receiving circuit 108 corresponding to the wireless power receiving unit 17 is less than a threshold at which the power supply stop from the power feeder 3 may be checked, the power receiving control unit 16 detects the power supply stop from the power feeder 3. The power receiving control unit 16 is an example of the "detection unit".

If a power receiving stop is notified from the power receiving control unit 16, the power receiving module control unit 11 performs an inquiry of position information to the portable terminal 2. Similar to the second embodiment, the power receiving module control unit 11 performs the power control and the setting of the operation mode of the portable terminal 2, based on the position information.

Figure 20:
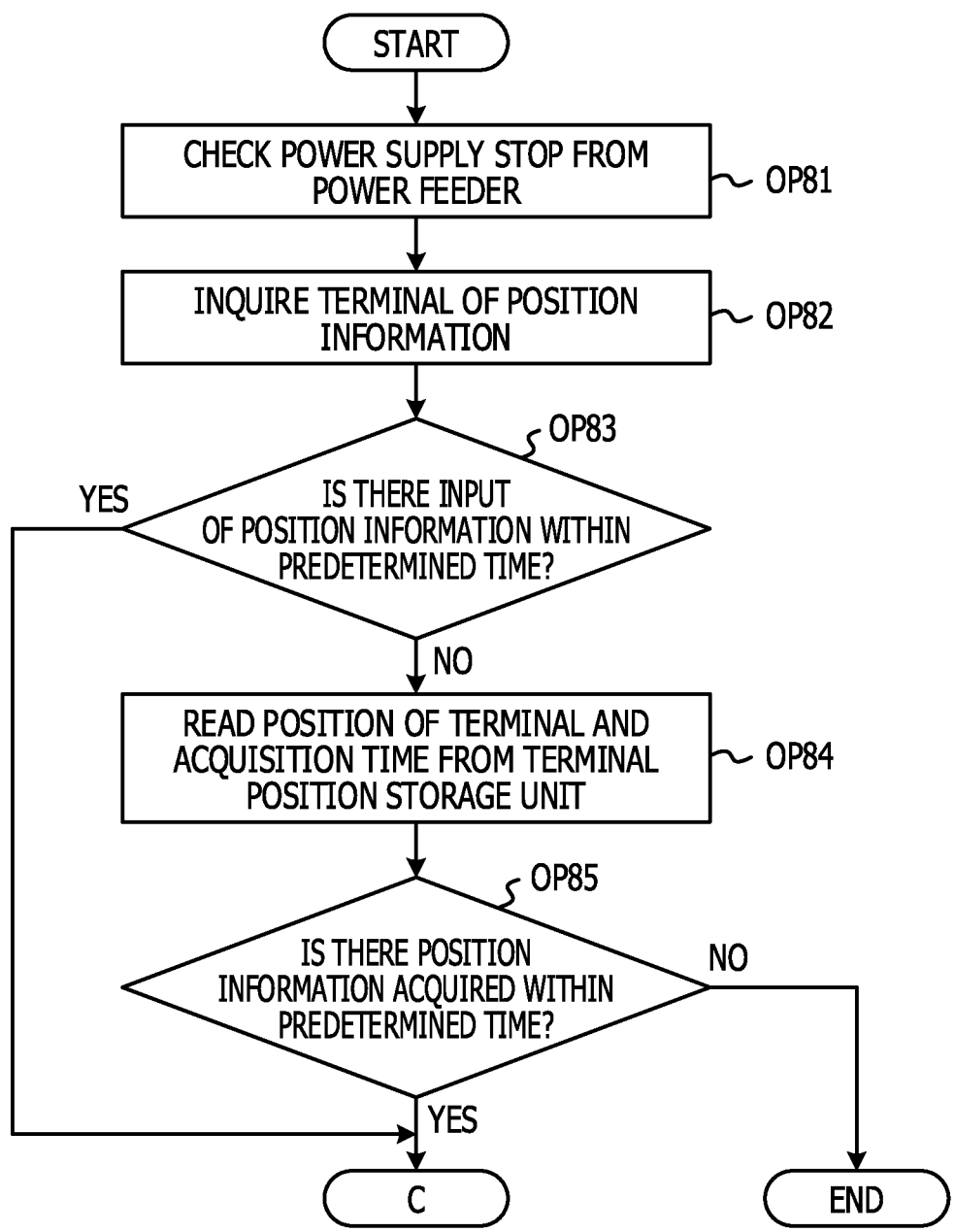
FIG. 20 is an example of a flowchart of a process of the power receiving module control unit of the power receiving module, according to a third embodiment.

FIG. 20 is an example of a flowchart of a process of the power receiving module control unit 11 of the power receiving module 1, according to the third embodiment. The process illustrated in FIG. 20 is started when the notification of the power supply stop of the power feeder 3 is input from the power receiving control unit 16.

In OP81, the power receiving module control unit 11 receives the notification of the power supply stop of the power feeder 3 from the power receiving control unit 16. Next, the process proceeds to OP82.

In OP82, the power receiving module control unit 11 inquire the portable terminal 2 of the current position information. Next, the process proceeds to OP83. The process following OP82 is the same as the process following OP54 of FIG. 15A of the second embodiment, and the power receiving module control unit 11 determines the power-off of the portable terminal 2 and the operation mode of the next activation, based on the position information acquired from the portable terminal 2.

Figure 21A:
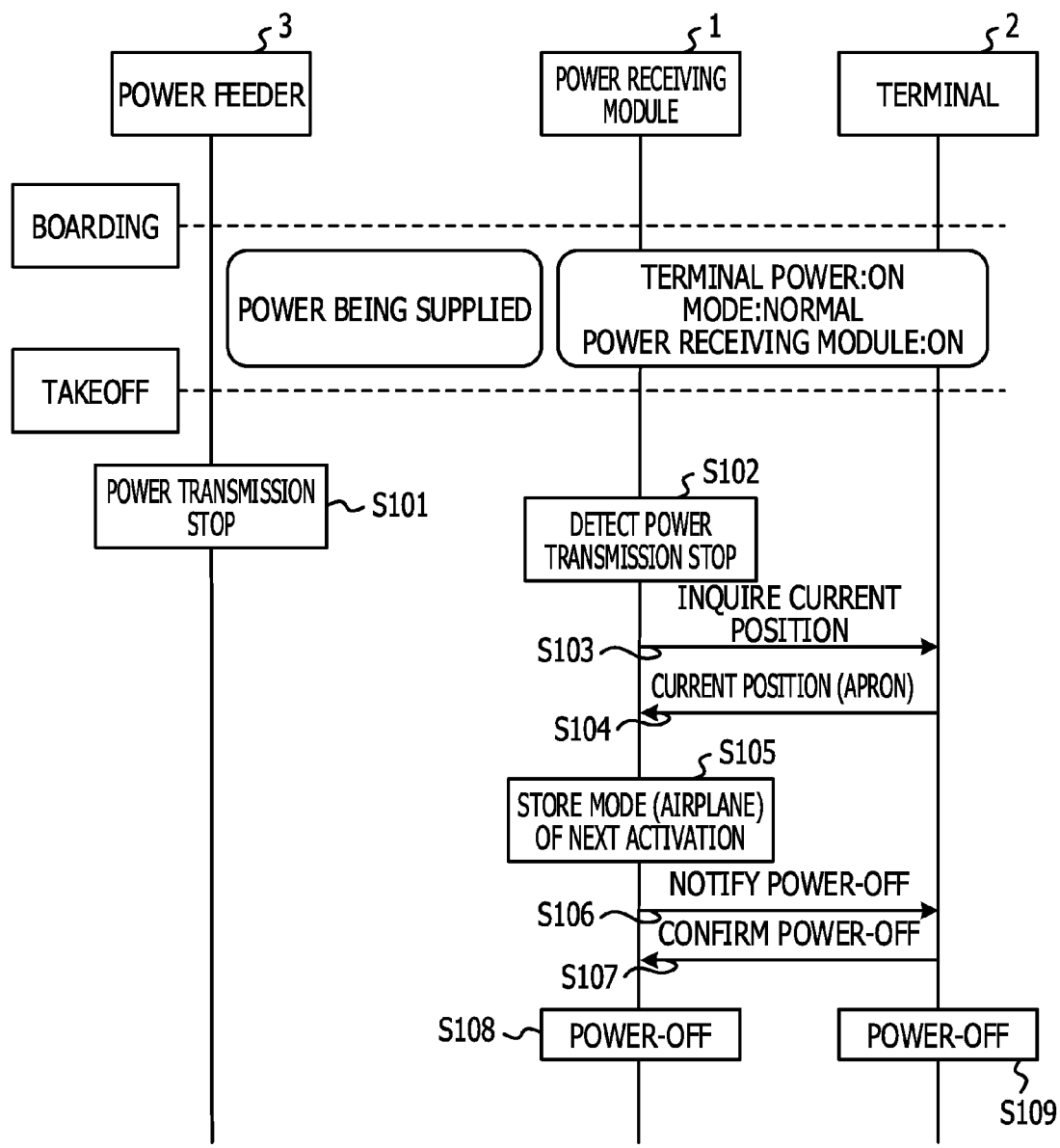
FIG. 21A is a diagram illustrating an example of a process sequence among the power receiving module, a portable terminal, and the power feeder, if the user is aboard the airplane, when the power receiving module and the portable terminal are both in the power-on state, according to a third embodiment.

FIG. 21A is a diagram illustrating an example of a process sequence among the power receiving module 1, the portable terminal 2, and the power feeder 3, if the user is aboard the airplane, when the power receiving module 1 and the portable terminal 2 are both in the power-on state, according to a third embodiment. Before boarding, the operation mode of the portable terminal 2 is the normal mode.

In S101, if the airplane is prepared for takeoff, the power feeder 3 stops power supply, for example, by the operation input of the crew or the like. In S102, the power receiving module 1 detects the power supply stop from the power feeder 3 (in FIG. 20, OP81).

In S103, since the power supply stop from the power feeder 3 is detected, the power receiving module 1 inquires the portable terminal 2 of the position information (in FIG. 20, OP82). In S104, the portable terminal 2 receives the inquiry of the position information from the power receiving module 1 acquires the area information "apron" as the position information, and notifies the area information "apron" as the position information, to the power receiving module 1.

In S105, since the area information "apron" corresponds to the specific area 1 (in FIG. 15B, OP58: YES), the power receiving module 1 stores the "airplane mode" as the operation mode of the next activation of the portable terminal 2, in the operation mode storage unit 13 (in FIG. 15B, OP59).

In S106, the power receiving module 1 notifies the power-off to the portable terminal 2 (in FIG. 7B, OP10). In S107, the portable terminal 2 notifies the power receiving module of an acknowledgement for the power-off, with respect to the notification of the power-off from the power receiving module 1.

In S108, since the notification of the acknowledgement for the power-off is received from the portable terminal 2 (in FIG. 7B, OP11: YES), the power of the power receiving module 1 is turned off (in FIG. 7B, OP14). In S109, the power of the portable terminal 2 is turned off.

If the process up to S109 is completed, the powers of the portable terminal 2 and the power receiving module 1 both are turned off. In other words, even if the user is aboard the airplane while the portable terminal 2 is in a power-on state, if the airplane is prepared for takeoff and the power supply from the power feeder 3 is stopped, the power receiving module 1 acquires the position information, and automatically determines the power-off of the portable terminal 2 and the power receiving module 1, from the position information. Further, the operation mode of the next activation of the portable terminal 2 is automatically determined as "airplane mode". Hereinafter, for example, while the airplane is cruising, if the user turns on the power of the portable terminal 2, "airplane mode" is set in the operation mode storage unit 13, and thus the portable terminal 2 is activated in the airplane mode.

FIG. 21B is a diagram illustrating an example of a process sequence when the portable terminal 2 is activated in the airplane mode while the airplane is cruising, after the process of FIG. 21A, and thereafter, the airplane is prepared for landing.

In S111, if the airplane is prepared for landing, the power feeder 3 stops the power transmission for example, by the operation input. In S112, the power receiving module 1 detects the power supply stop from the power feeder 3 (in FIG. 20, OP81).

In S113, since the power supply stop from the power feeder 3 is detected, the power receiving module 1 inquires the portable terminal 2 of the position information (in FIG. 20, OP82). In S114, since the airplane is flying, the portable terminal 2 is not able to acquire area information from a transmitter on the ground, and notifies the power receiving module 1 of the GPS coordinate information as the position information.

In S115, since the airplane is flying and it is not possible to determine whether or not the current position is within the specific area from the GPS coordinate information (in FIG. 15B, OP58: NO), the power receiving module 1 calculates a moving speed from the coordinate information (in FIG. 15B, OP60).

In S116, since the airplane is flying, the moving speed is faster than the predetermined threshold (in FIG. 15B, OP61: YES), such that the power receiving module 1 stores the "normal mode" in the operation mode storage unit 13 (in FIG. 15B, OP62).

In S117, the power receiving module 1 notifies the power-off to the portable terminal 2 (in FIG. 7B, OP10). In S118, the portable terminal 2 notifies the power receiving module of an acknowledgement for the power-off, with respect to the notification of the power-off from the power receiving module 1.

Since the notification of the power-off is received from the portable terminal 2 (in FIG. 7B, OP11: YES), in S119, the power of the power receiving module 1 is turned OFF (in FIG. 7B, OP14). In S120, the power of the portable terminal 2 is turned off.

From the above, while the airplane is cruising, if the user turns on the power of the portable terminal 2, the airplane is prepared for landing, and the power supply stop of the power feeder 3 is detected, the power receiving module 1 calculates a moving speed, and determines the power-off of the portable terminal 2 and the power receiving module 1, and the operation mode of the next activation as the "normal mode".

Figure 22:
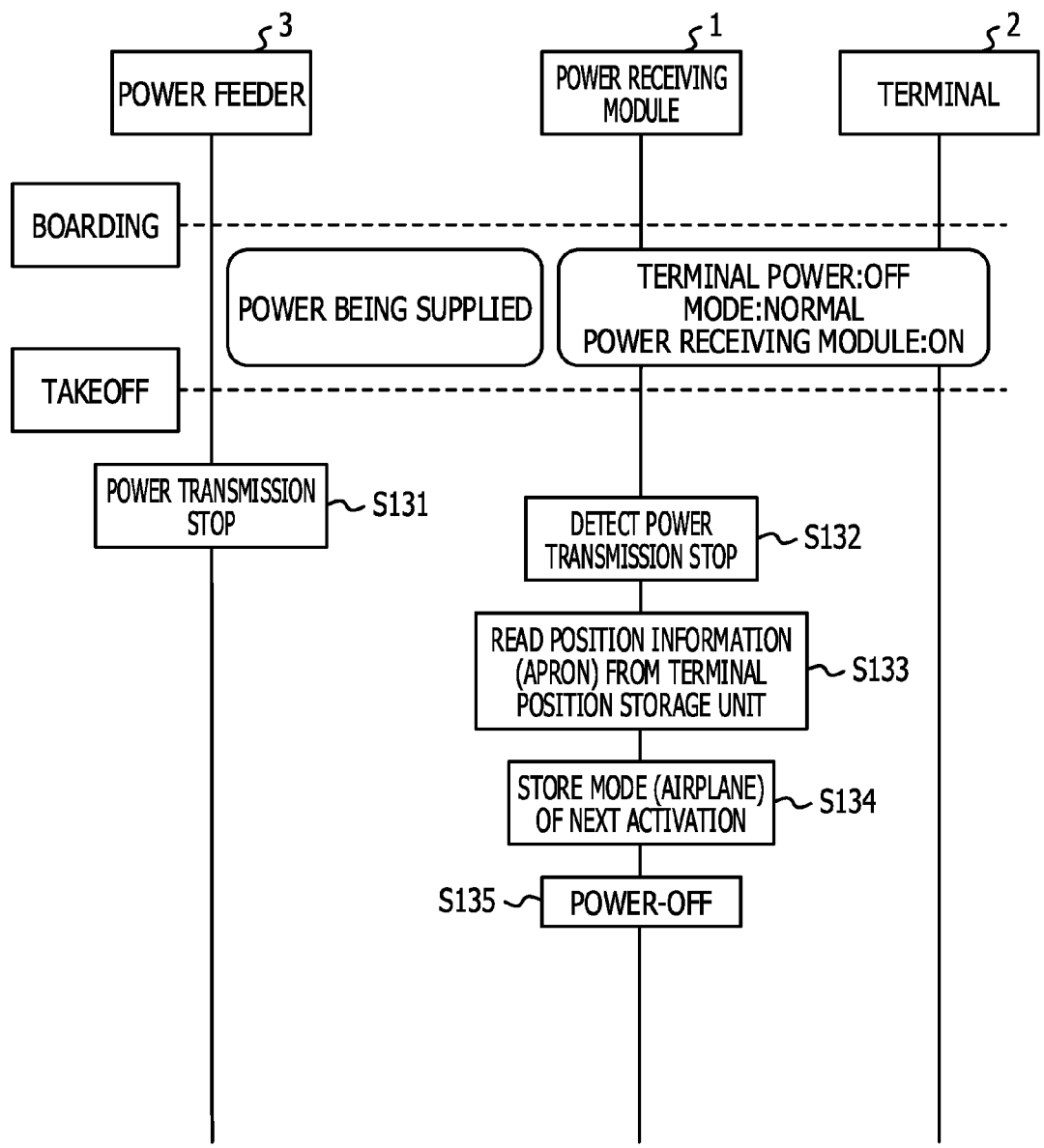
FIG. 22 is a diagram illustrating an example of a process sequence among the power receiving module, the portable terminal, and the power feeder, when the portable terminal is in the power-off state, the power receiving module is in the power-on state, and the user is aboard the airplane.

FIG. 22 is a diagram illustrating an example of a process sequence among the power receiving module 1, the portable terminal 2, and the power feeder 3, when the portable terminal 2 is in a power-off state, the power receiving module 1 is in a power-on state, and the user is aboard the airplane. Even if the power of the portable terminal 2 is turned off by the user, the power receiving module 1 maintains the power-on state. Before boarding, the operation mode of the portable terminal 2 is the normal mode.

In S131, if the airplane is prepared for landing, the power feeder 3 stops the power transmission for example, by the operation input. In S132, the power receiving module 1 detects the power supply stop from the power feeder 3 (in FIG. 20, OP81).

In S133, since the power supply stop of the power feeder 3 is detected (in FIG. 20, OP81), the portable terminal 2 is in a power-off state, and the current position information is obtained (in FIG. 20, OP83: NO), the power receiving module 1 reads the position information and the acquisition time from the terminal position storage unit 14 (in FIG. 20, OP84). It is assumed that the area information "apron" and the acquisition time prior to a predetermined time than the present time are stored in the terminal position storage unit 14.

In S134, since the area information "apron" corresponding to the specific area 1 prior to a predetermined time than the present time is acquired, from the terminal position storage unit 14 (in FIG. 20, OP85: YES, and in FIG. 15B, OP58: YES), the power receiving module 1 stores the "airplane mode" in the operation mode storage unit 13, as the operation mode of the next activation of the portable terminal 2 (in FIG. 15B, OP59).

In S135, since the portable terminal 2 is in a power-off state (in FIG. 7B, OP9: NO), the power receiving module 1 turns off the power of the power receiving module 1 (in FIG. 7B, OP14).

Thereafter, when the airplane enters the stable flight, and the user turns on the power of the portable terminal 2, since the "airplane mode" is stored in the operation mode storage unit 13 of the power receiving module 1, the portable terminal 2 is activated in the airplane mode. In other words, when the portable terminal 2 is in a power-off state, and the operation mode is the normal mode, even if the user is aboard the airplane, the operation mode is changed to the airplane mode, and while the airplane is cruising, if the user turns on the portable terminal 2, the portable terminal 2 is automatically activated in the airplane mode.

Operation and Effect of Third Embodiment

In the third embodiment, if the power supply stop of the power feeder 3 is detected, the power receiving module 1 determines the power-on or off and operation mode of the portable terminal 2 from the position information. Thus, the power receiving module 1 can automatically change the power state and the operation mode of the portable terminal 2, depending on a situation, without using the control signal from the power feeder 3.

Further, in the third embodiment, even if the portable terminal 2 is in a power-off state, the power receiving module 1 is in a power-on state, such that even if the portable terminal 2 is in a power-off state, it is possible to detect the power supply stop of the power feeder 3. Further, the power receiving module 1 acquires position information from the portable terminal 2 at a predetermined interval, and stores the position information in the terminal position storage unit 14. Thus, even if the portable terminal 2 is in a power-off state, the power receiving module 1 can acquire the position information, when the position information is acquired within a predetermined time, it is possible to set the operation mode of the portable terminal 2 while the portable terminal 2 is in a power-off state.

In the third embodiment, if the power supply stop of the power feeder 3 is detected, the power receiving module 1 determines the power-on or off and operation mode of the portable terminal 2 from the position information, without using the control signal of the wireless power supply. Therefore, when the wireless power supply system 100 of the third embodiment is introduced, without changing the setting of the power feeder 3 side, for example, a program may be installed in the portable terminal 2 and the power receiving module 1, and it is possible to suppress introduction cost.

Others

In addition, the wireless power supply system 100 in the airplane has been described in the first to third embodiments, but the application of the wireless power supply system 100 is not limited to the airplane. The wireless power supply system 100 is applicable, for example, to a bullet train, and public places such as the Internet café in which the wireless power supply service is performed.

In the first to third embodiments, the wireless power supply system 100 adopting the wireless power supply scheme of the magnetic field resonance scheme has been described, but is not limited thereto. For example, the wireless power supply scheme of the electromagnetic induction scheme may be adopted, by placing the portable terminal 2 and the power feeder 3 in a communication possible range. Further, the communication scheme of the control signal between the power receiving module 1 and the power feeder 3 is also not limited to the Bluetooth, and is applicable to the wireless power supply scheme adopted in the wireless power supply system 100.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A power receiving device configured to receive power from a power supply device through wireless communication, comprising:
   power receiving circuitry configured to supply power received from the power supply device to a communication terminal;
   reception circuitry configured to receive a predetermined control signal containing information about power supply termination, from the power supply device;
   a memory configured to store position information acquired from the communication terminal; and
   a processor coupled to the memory, configured to:
   based on the position information and the predetermined control signal received by the reception circuitry, control power supplied to the communication terminal and control an operation mode of the communication terminal, and
   turn off power supplied to the communication terminal and control a predetermined operation mode, as the operation mode of the communication terminal for a next activation of the communication terminal, based on the position information, when a location of the communication terminal is determined to be within a predetermined area.

2. The power receiving device according to claim 1, wherein the predetermined control signal includes a designation of power-on or off, and the operation mode, and
wherein the processor controls the power supplied to the communication terminal and the operation mode of the communication terminal, according to the designation in the predetermined control signal.

3. The power receiving device according to claim 1, wherein the processor calculates a moving speed of the communication terminal from the position information, and when the moving speed is equal to or greater than a predetermined threshold, the processor turns off the power supplied to the communication terminal and controls the predetermined operation mode.

4. The power receiving device according to claim 1, wherein the reception circuitry receives the predetermined control signal containing environmental change information, from the power supply device, and
wherein the processor controls the power supplied to the communication terminal and controls the operation mode of the communication terminal, based on the environmental change information contained in the predetermined control signal.

5. The power receiving device according to claim 1, wherein when power of the communication terminal is off, after receiving notification of power on of the communication terminal, the processor notifies the communication terminal of the operation mode.

6. The power receiving device according to claim 1, further comprising:
a power-off control circuitry configured to turn off power of the power receiving device, independent of the power-off of the communication terminal.

7. The power receiving device configured to receive power from a power supply device through wireless communication, the method comprising:
supplying power received from the power supply device to a communication terminal;
receiving, by the power receiving device, a predetermined control signal containing information about power supply termination, from the power supply device;
storing position information acquired from the communication terminal;
based on the position information and the predetermined control signal received by the power receiving device, controlling power supplied to the communication terminal and controlling an operation mode of the communication terminal; and
turning off power supplied to the communication terminal and controlling a predetermined operation mode, as the operation mode of the communication terminal for a next activation of the communication terminal, based on the position information, when a location of the communication terminal is determined to be within a predetermined area.

8. A power receiving device configured to receive power from a power supply device, comprising:
- a detector configured to detect a power supply stop of the power supply device in which the power supply device stops supplying power that is received by a communication terminal from the power supply device via the power receiving device;
- a memory; and
- a processor coupled to the memory, configured to instruct the communication terminal to turn off power of the communication terminal, when the power supply stop of the power supply device is detected.

9. The power receiving device according to claim 8:
wherein the memory stores position information acquired from the communication terminal, and
wherein when the power supply stop of the power supply device is detected, the processor sets an operation mode of the communication terminal for a next activation of the communication terminal, according to the position information.

10. The power receiving device according to claim 9,
wherein the processor calculates a moving speed of the communication terminal from the position information, and when the moving speed is equal to or greater than a predetermined threshold, the processor performs a setting of a predetermined operation mode, as the operation mode of the communication terminal for the next activation of the communication terminal.

11. The power receiving device according to claim 8, further comprising:
- power-off control circuitry configured to turn off power of the power receiving device, independent of the power-off of the communication terminal, when the power supply stop of the power supply device is detected.

* * * * *